(12) United States Patent
Itoh et al.

(10) Patent No.: US 10,071,861 B2
(45) Date of Patent: Sep. 11, 2018

(54) PASSAGE FORMING APPARATUS

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Kosuke Toda, Miki (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/309,743

(22) PCT Filed: Mar. 22, 2016

(86) PCT No.: PCT/JP2016/058935
§ 371 (c)(1),
(2) Date: Nov. 8, 2016

(87) PCT Pub. No.: WO2016/152837
PCT Pub. Date: Sep. 29, 2016

(65) Prior Publication Data
US 2017/0267456 A1    Sep. 21, 2017

(30) Foreign Application Priority Data
Mar. 23, 2015  (JP) ................................ 2015-059305

(51) Int. Cl.
*B65G 15/26*    (2006.01)
*B65G 41/00*    (2006.01)
(Continued)

(52) U.S. Cl.
CPC .................... *B65G 21/14* (2013.01)

(58) Field of Classification Search
None
See application file for complete search history.

(56) References Cited

U.S. PATENT DOCUMENTS

| 4,281,955 A * | 8/1981 | McWilliams | B65G 21/14 198/303 |
| 6,431,346 B1 * | 8/2002 | Gilmore | B65G 21/14 198/588 |

FOREIGN PATENT DOCUMENTS

| JP | 60-193310 | 12/1985 |
| JP | 61-273405 A | 12/1986 |

(Continued)

OTHER PUBLICATIONS

International Search Report for Application No. PCT/JP2016/058935, dated Jun. 7, 2016.
(Continued)

*Primary Examiner* — Kavel Singh
(74) *Attorney, Agent, or Firm* — Wood, Phillips, Katz, Clark & Mortimer

(57) ABSTRACT

A path forming device for forming a part of a series of article conveying passage and opening a path for passing through when a worker crosses the article conveying passage, the path forming device including: a fixed side conveyor device located at a constant height position; a movable side conveyor device; a lifting and lowering function that lifts and lowers the movable side conveyor device; and a linear movement function that linearly moves the movable side conveyor device, wherein the movable side conveyor device is capable of taking: an article conveying posture in which the movable side conveyor device protrudes from the fixed side conveyor device in a cantilever state, and is linearly aligned with the fixed side conveyor at substantially the same height as the fixed side conveyor; and a path opening posture in which a height of the movable side conveyor device is lowered by the lifting and lowering function, the movable side conveyor device is made to move to the fixed side conveyor device by the linear movement function, the movable side conveyor device is located under the fixed side (Continued)

conveyor device, and a part of or all of the movable side conveyor device overlaps with the fixed side conveyor device on the same plane.

17 Claims, 14 Drawing Sheets

(51) Int. Cl.
    *B65G 13/12*     (2006.01)
    *B65G 15/00*     (2006.01)
    *B65G 21/14*     (2006.01)

(56) References Cited

FOREIGN PATENT DOCUMENTS

| JP | 1-180416 | 12/1989 |
| JP | 07-144729 A | 6/1995 |
| JP | 2008-37582 A | 2/2008 |

OTHER PUBLICATIONS

International Preliminary Report on Patentability and Written Opinion, dated Sep. 26, 2017 in PCT/JP2016/058935.

\* cited by examiner

PASSAGE FORMING APPARATUS

TECHNICAL FIELD

The present invention relates to a path forming device that is provided in a conveying device for conveying an article along a conveying passage, and forms a path capable of crossing the conveying passage, and relates to a path forming device that forms a part of the conveying passage by disposing a conveyor device on a path, and that is capable of retreating the conveyor device from the path when a worker, a carrier, a forklift, or the like passes through the path.

BACKGROUND ART

Recent conveying devices have a large number of conveying passages for conveying an article in various directions. On the other hand, an area where the conveying device is installed, such as in a factory, is limited, and a large number of the conveying passages are disposed in this limited area. Therefore, it is not easy for a worker, a carrier, or a work vehicle such as a forklift to move inside the conveying device.

Conventionally, a connecting stair or a flip-up conveyor device has been installed in order to enable a worker or a work vehicle to move inside the conveying device.

Although the worker can pass through the connecting stair, the work vehicle cannot pass through the connecting stair. Additionally, the flip-up conveyor device is installed adjacent to a fixed conveyor device, and a flip-up movable section in the flip-up conveyor device moves above the fixed conveyor device. Therefore, a space for enabling the flip-up movable section to move has to be provided above the fixed conveyor device. Additionally, large power for operating the flip-up movable section is required.

In order to solve these problems, it is considered that a first conveying passage and a second conveying passage are connected by an extendable conveyor device.

That is, when the whole length of the conveyor device is extended, the first conveying passage and the second conveying passage are connected, and an article can be conveyed. When the whole length of the conveyor device is contracted to be shortened, the first conveying passage and the second conveying passage are cut, and it is possible to form a space through which a worker or a work vehicle can pass. Additionally, the extendable conveyor device does not need to provide a space above the fixed conveyor device However, according to examination conducted by the present inventors, such a conventional technology cannot be found, and Patent Document 1 similar to the conventional technology has been found.

PRIOR ART DOCUMENT

Patent Document

Patent Document 1: JP H07-144729 A

DISCLOSURE OF INVENTION

Technical Problem

In a conveyor disclosed in Patent Document 1, a carrier roller is fixed to a chain. The carrier roller is horizontally moved by feeding operation or winding operation of the chain. A driving source for rotating the carrier roller does not exist, and an article on the carrier roller cannot be moved to another adjacent conveyor when a worker does not push the article by his/her hand. That is, the conveyor disclosed in Patent Document 1 is not a conveyor that exhibits an effect desired by this applicant.

An object of the present invention is to provide a path forming device capable of retreating a movable conveyor device into a fixed conveyor device to form a path for a worker or a work vehicle, and capable of holding a conveying surface of the conveyor device at a constant height regardless of weight of an article when the movable conveyor device is disposed in a path.

Solution to Problem

An aspect of the present invention for solving the above problems is a path forming device for forming a part of a series of article conveying passage and opening a path for passing through when a worker crosses the article conveying passage, the path forming device including: a fixed side conveyor device located at a constant height position; a movable side conveyor device; a lifting and lowering function that lifts and lowers the movable side conveyor device; and a linear movement function that linearly moves the movable side conveyor device, wherein the movable side conveyor device is capable of taking: an article conveying posture in which the movable side conveyor device protrudes from the fixed side conveyor device in a cantilever state, and is linearly aligned with the fixed side conveyor device at substantially the same height as the fixed side conveyor device; and a path opening posture in which a height of the movable side conveyor device is lowered by the lifting and lowering function, the movable side conveyor device is made to move to the fixed side conveyor device by the linear movement function, the movable side conveyor device is located under the fixed side conveyor device, and a part of or all of the movable side conveyor device overlaps with the fixed side conveyor device on the same plane.

In this aspect, the path forming device includes the lifting and lowering function for lifting and lowering the movable side conveyor device, and the linear movement function for linearly moving the movable side conveyor device, and therefore the movable side conveyor device can perform lifting and lowering movement and linear movement. Herein, the linear movement means movement in the horizontal direction or in the substantially horizontal direction.

The movable side conveyor device can take the article conveying posture and the path opening posture.

That is, the movable side conveyor device linearly moves to protrude from the side of the fixed side conveyor device in the cantilever state, and the movable side conveyor device further rises while protruding, so that the movable side conveyor device is disposed at substantially the same height as the fixed side conveyor device which is located at the constant height position.

As a result, the movable side conveyor device is linearly aligned with the fixed side conveyor device, and the conveying surface of the fixed side conveyor device and the conveying surface of the movable side conveyor device become at substantially the same height, and are linearly linked (article conveying posture). Additionally, the movable side conveyor device protrudes from the side of the fixed side conveyor device in the cantilever state, and therefore when the movable side conveyor device is housed in the side of the fixed side conveyor device, nothing exists on the path, and a worker or the like can pass.

The movable side conveyor device protrudes from the side of the fixed side conveyor device in the cantilever state, and has rigidity. Accordingly, even when an article is placed on the conveying surface of the movable side conveyor device, the conveying surface of the movable side conveyor device is not distorted or lowered. Therefore, the article can smoothly move between the movable side conveyor device and another conveyor device adjacent on the downstream side in conveying direction of the movable side conveyor device.

The height of the movable side conveyor device is lowered by the lifting and lowering function, and the movable side conveyor device is made to move to the side of the fixed side conveyor device by the linear movement function, the movable side conveyor device is located under the fixed side conveyor device, and a part of or all of the movable side conveyor device overlaps with the fixed side conveyor device on the same plane (path opening posture). That is, the movable side conveyor device can be housed below the fixed side conveyor device, and it is possible to save space in the path opening posture.

A linear guide that guides the movable side conveyor device so as to linearly move; an engaging member that linearly moves; and a cam are preferably provided, the engaging member is preferably engaged with the movable side conveyor device to push and pull the movable side conveyor device, and the movable side conveyor device is preferably engaged with the cam to be made to lift and lower.

In this aspect, the linear guide enables the movable side conveyor device to reliably linearly move. That is, when the linear guide extends in the horizontal direction, the movable side conveyor device can move in the horizontal direction along the linear guide.

The engaging member is engaged with the movable side conveyor device to push and pull the movable side conveyor device, and therefore the movable side conveyor device linearly reciprocates along the linear guide.

That is, the movable side conveyor device is pushed by the engaging member to linearly move along with the engaging member in the direction away from the fixed side conveyor device. Additionally, the movable side conveyor device is pulled by the engaging member, and linearly moves along with the engaging member in the direction of approaching the fixed side conveyor device.

The movable side conveyor device is engaged with the cam to lift. That is, the lifting and lowering function can be simply composed of the cam.

The cam is preferably formed in the engaging member, the path forming device preferably includes a movement preventing unit that prevents the movable side conveyor device from moving in a direction away from the fixed side conveyor device beyond a terminal position, the terminal position being defined as a position where the movable side conveyor device protrudes from the fixed side conveyor device in the cantilever state to reach a state in which the movable side conveyor device and the fixed side conveyor device do not overlap with each other on the same plane, and when the movable side conveyor device is at the terminal position and the engaging member further moves, the movable side conveyor device is preferably raised by the cam provided in the engaging member to reach substantially the same height as the fixed side conveyor device.

In this aspect, when the engaging member pushes the movable side conveyor device in the direction away from the fixed side conveyor device, the movable side conveyor device linearly moves until the movable side conveyor device reaches the terminal position. Then, when the movable side conveyor device reaches the terminal position, the movement preventing unit stops the linear movement of the movable side conveyor device. That is, the engaging member cannot linearly move the movable side conveyor device beyond the terminal position.

In other words, the movement preventing unit can reliably prevent the movable side conveyor device from linearly moving in the horizontal direction at the terminal position where the movable side conveyor device protrudes from the fixed side conveyor device in the cantilever state as much as possible.

When the movable side conveyor device is located at the terminal position where the movable side conveyor device protrudes from the fixed side conveyor device in the cantilever state as much as possible, the movable side conveyor device and the fixed side conveyor device do not overlap with each other on the same plane, and therefore the movable side conveyor device can rise without colliding with the fixed side conveyor device.

The cam is formed in the engaging member, and therefore when the engaging member further linearly moves, the movable side conveyor device which stops moving in the linear direction is lifted to be raised by the cam. Then, the movable side conveyor device can reach substantially the same height as the fixed side conveyor device.

To the contrary, when the engaging member moves to the side of the fixed side conveyor device, the movable side conveyor device lifted by the cam first lowers. When the engaging member further moves to the side of the fixed side conveyor device, the movable side conveyor device located at the terminal position is pulled by the engaging member to linearly move to the side of the fixed side conveyor device.

An intermediate interposed member is preferably provided between the fixed side conveyor device and the movable side conveyor device, the intermediate interposed member being linearly movable with respect to the fixed side conveyor device, the movable side conveyor device being further linearly movable with respect to the intermediate interposed member, and a linear movement direction of the intermediate interposed member with respect to the fixed side conveyor device, and a linear movement direction of the movable side conveyor device with respect to the intermediate interposed member preferably coincide with each other.

In this aspect, the intermediate interposed member is provided between the fixed side conveyor device and the movable side conveyor device, and the intermediate interposed member can linearly move with respect to the fixed side conveyor device, and therefore when the intermediate interposed member linearly moves with respect to the fixed side conveyor device, the movable side conveyor device also linearly moves with respect to the fixed side conveyor device.

The movable side conveyor device can linearly move with respect to the intermediate interposed member, and the linear movement direction of the intermediate interposed member with respect to the fixed side conveyor device and the linear movement direction of the movable side conveyor device with respect to the intermediate interposed member coincide with each other, and therefore the movable side conveyor device can further linearly move with respect to the fixed side conveyor device in the same direction. Therefore, the linear movement distance of the movable side conveyor device is long, and it is possible to use the long movable side conveyor device.

In other words, the long movable side conveyor device is housed in the fixed side conveyor device, so that it is possible to provide a path having a wide width.

The path forming device preferably includes: an annular member having the engaging member in a middle thereof; and a driving unit having a drive motor that makes the annular member run.

In this aspect, the annular member, the driving unit having the drive motor for making the annular member run are provided, and the engaging member is provided in the middle of the annular member, and therefore when the drive motor is driven, the engaging member linearly moves along with the annular member. When the drive motor rotates in the reverse direction, the engaging member can be made to run in the reverse direction.

The engaging member is preferably reciprocated by the single drive motor.

In this aspect, the engaging member is reciprocated by the single drive motor, and therefore the linear movement and the lifting and lowering movement of the movable side conveyor device can be performed by the single drive motor.

Effect of Invention

According to a path forming device of the present invention, a movable side conveyor device is retreated into a fixed side conveyor device, so that it is possible to form a path for a worker or a work vehicle. Additionally, when the movable side conveyor device is disposed in the path, a conveying surface of the movable side conveyor device can be held at a constant height regardless of weight of an article.

BRIEF DESCRIPTION OF DRAWINGS

FIGS. 13A, 13B and 13C each are a side view illustrated by transmitting a main section of the path forming device, wherein FIG. 13A illustrates the path opening posture, FIG. 13B illustrates a state where the movable side conveyor device protrudes from the side of the fixed side conveyor device, and FIG. 13C illustrates the article conveying posture in which the movable side conveyor device rises from the state of FIG. 13B.

BEST MODE FOR CARRYING OUT THE INVENTION

Hereinafter, description will be made with reference with the drawings.

Figure 1:
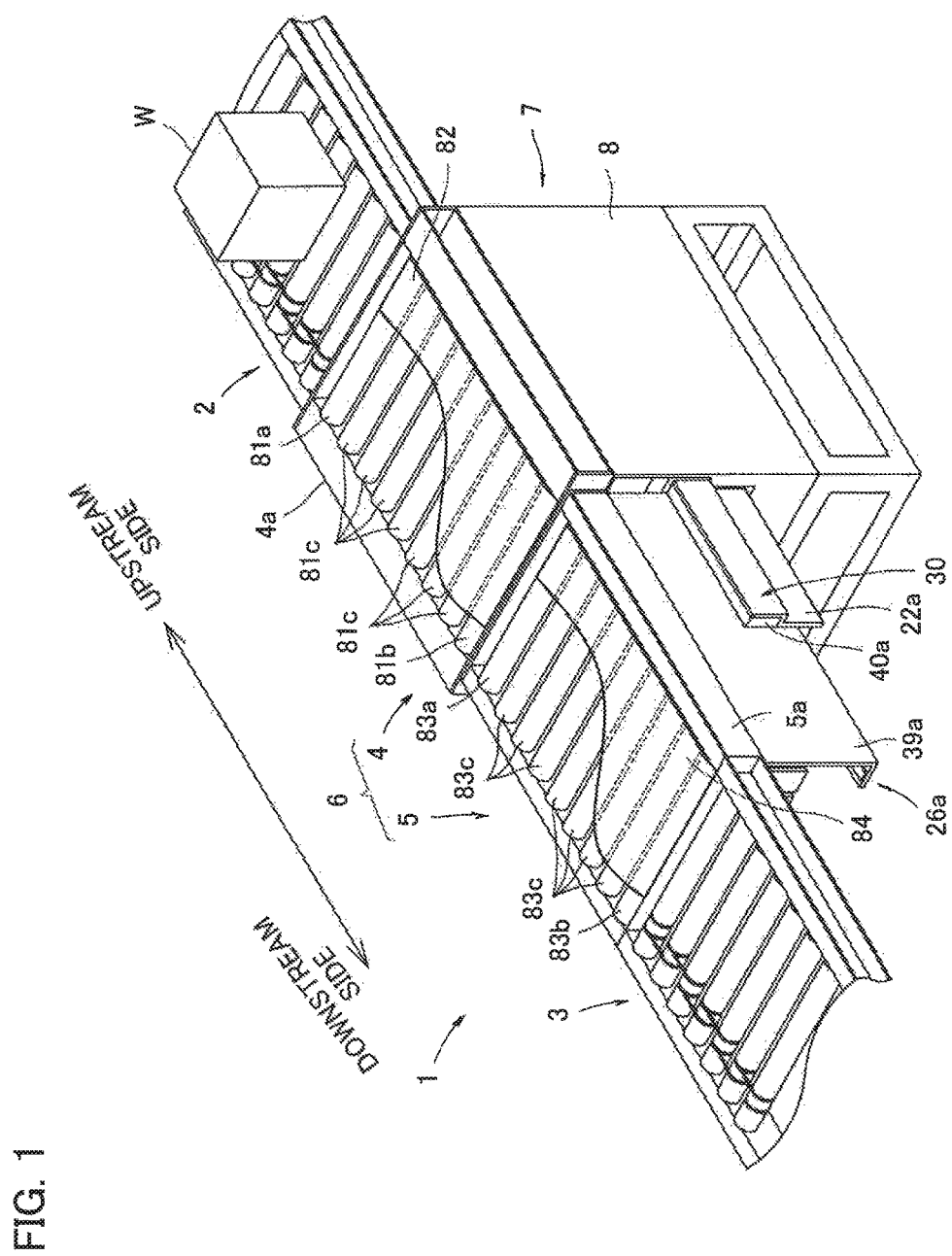
FIG. 1 is a partial perspective view of a conveying device having a path forming device according to an embodiment of the present invention, and illustrates an article conveying posture in which a movable side conveyor device of the path forming device protrudes from the side of a fixed side conveyor device.
Figure 2:
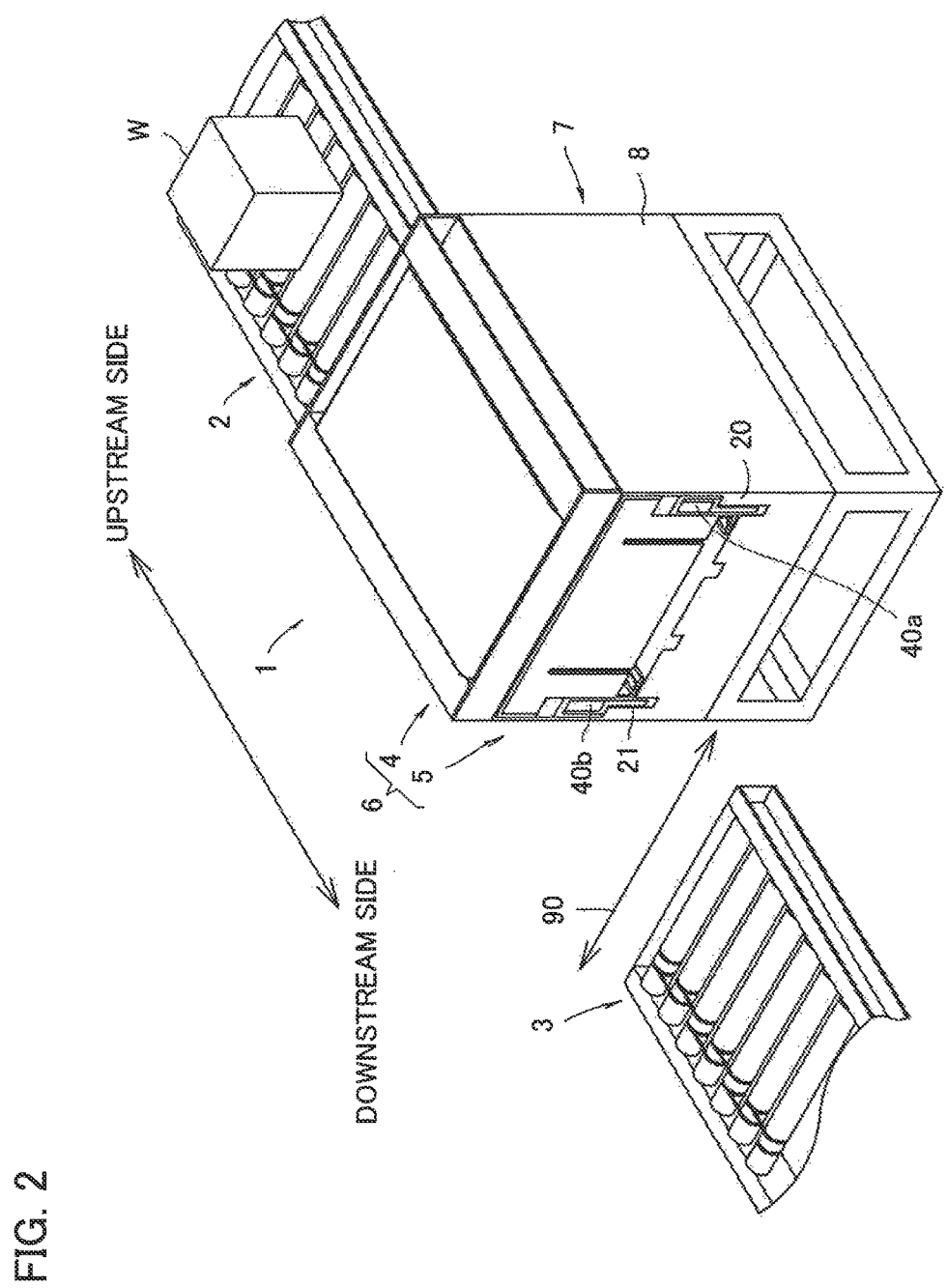
FIG. 2 is a partial perspective view of the conveying device having the path forming device according to the embodiment of the present invention, and illustrates a path opening posture in which the movable side conveyor device of the path forming device is housed in the fixed side conveyor device.

As illustrated in FIG. 1 and FIG. 2, a conveying device 1 (article conveying passage) has an upstream side conveyor 2, a downstream side conveyor 3, and a path forming device 6. The path forming device 6 is disposed between the upstream side conveyor 2 and the downstream side conveyor 3.

In FIG. 1 and FIG. 2, although in the conveying device 1, only the upstream side conveyor 2, the downstream side conveyor 3, and the path forming device 6 are illustrated, a large number of other conveyors are disposed adjacent to each other.

The upstream side conveyor 2 and the downstream side conveyor 3 each are a roller conveyor including a plurality of rollers. One of the plurality of rollers is a motor-incorporating roller (driving roller), and the others are follower rollers. The respective rollers are coupled by a belt, and power is transmitted to the rollers. That is, when the motor-incorporating roller is driven, the follower rollers also rotate, and an article W can be conveyed. The motor-incorporating rollers of the upstream side conveyor 2 and the downstream side conveyor 3 are driven, when a sensor (not illustrated) detects the article W.

Figure 3:
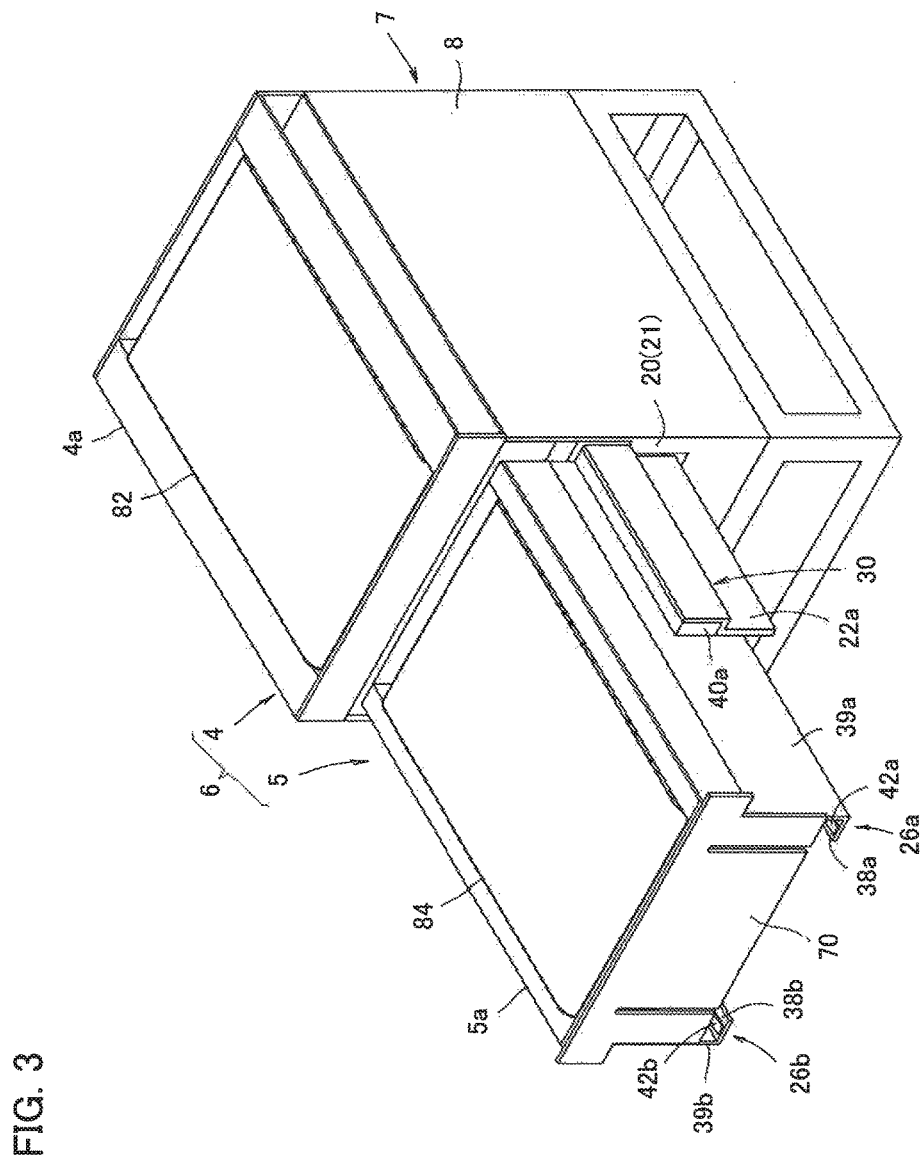
FIG. 3 is a perspective view of the path forming device according to the embodiment of the present invention, and illustrates a state where the movable side conveyor device protrudes from the fixed side conveyor device.
Figure 4:
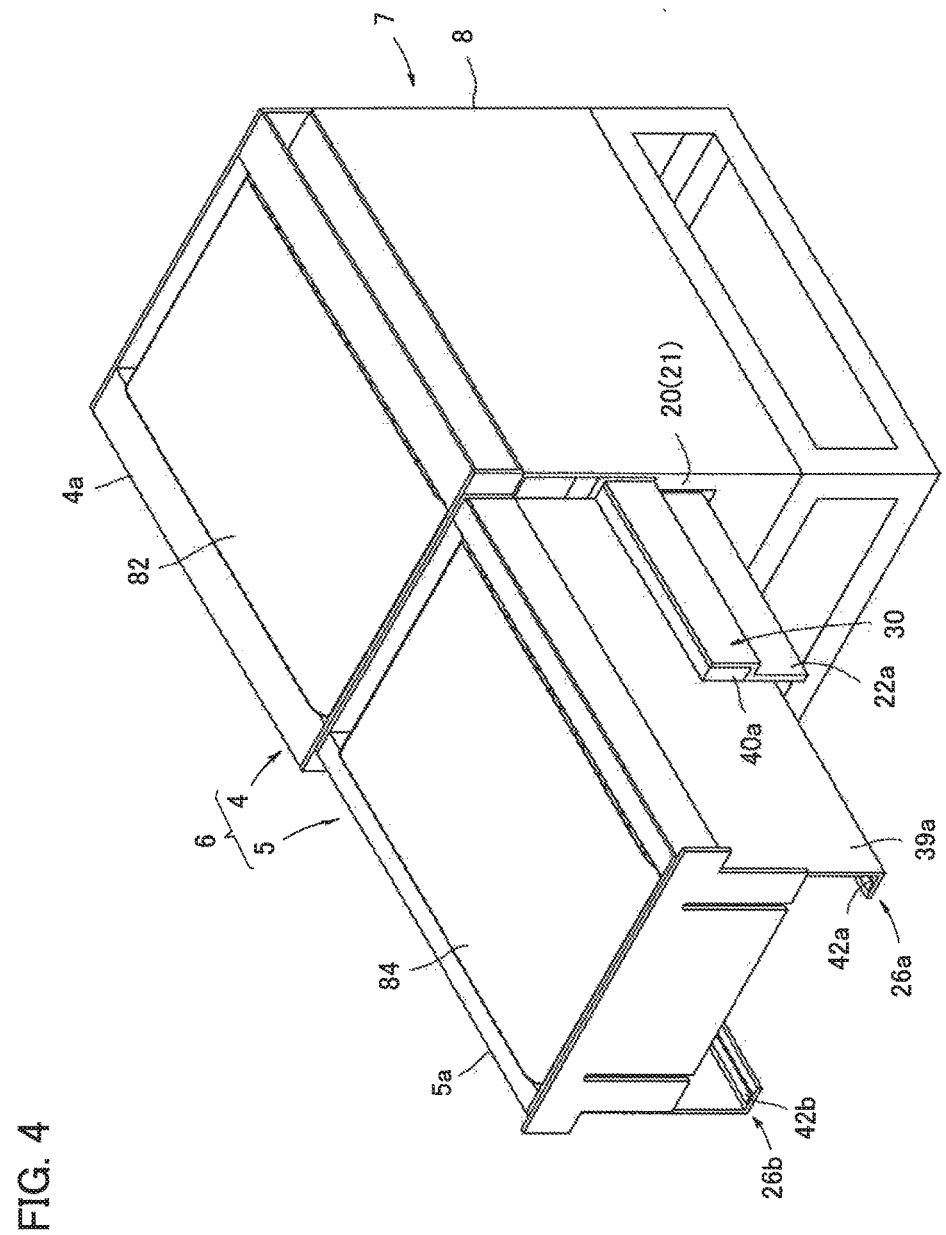
FIG. 4 is a perspective view of the path forming device according to the embodiment of the present invention, and illustrates a state where the movable side conveyor device rises from the state illustrated in FIG. 3 to take the article conveying posture.

As illustrated in FIG. 3 and FIG. 4, the path forming device 6 has a fixed side conveyor device 4, and a movable side conveyor device 5.

The fixed side conveyor device 4 is a belt conveyor device including a frame-shaped housing 4a, a driving pulley 81a, and a driven pulley 81b. Between the driving pulley 81a and the driven pulley 81b, a plurality of rollers 81c are disposed. Respective shafts of the driving pulley 81a, the driven pulley 81b, and the plurality of rollers 81c are fixed to the housing 4a.

The fixed side conveyor device 4 is installed on a driving device 7.

Figure 6:
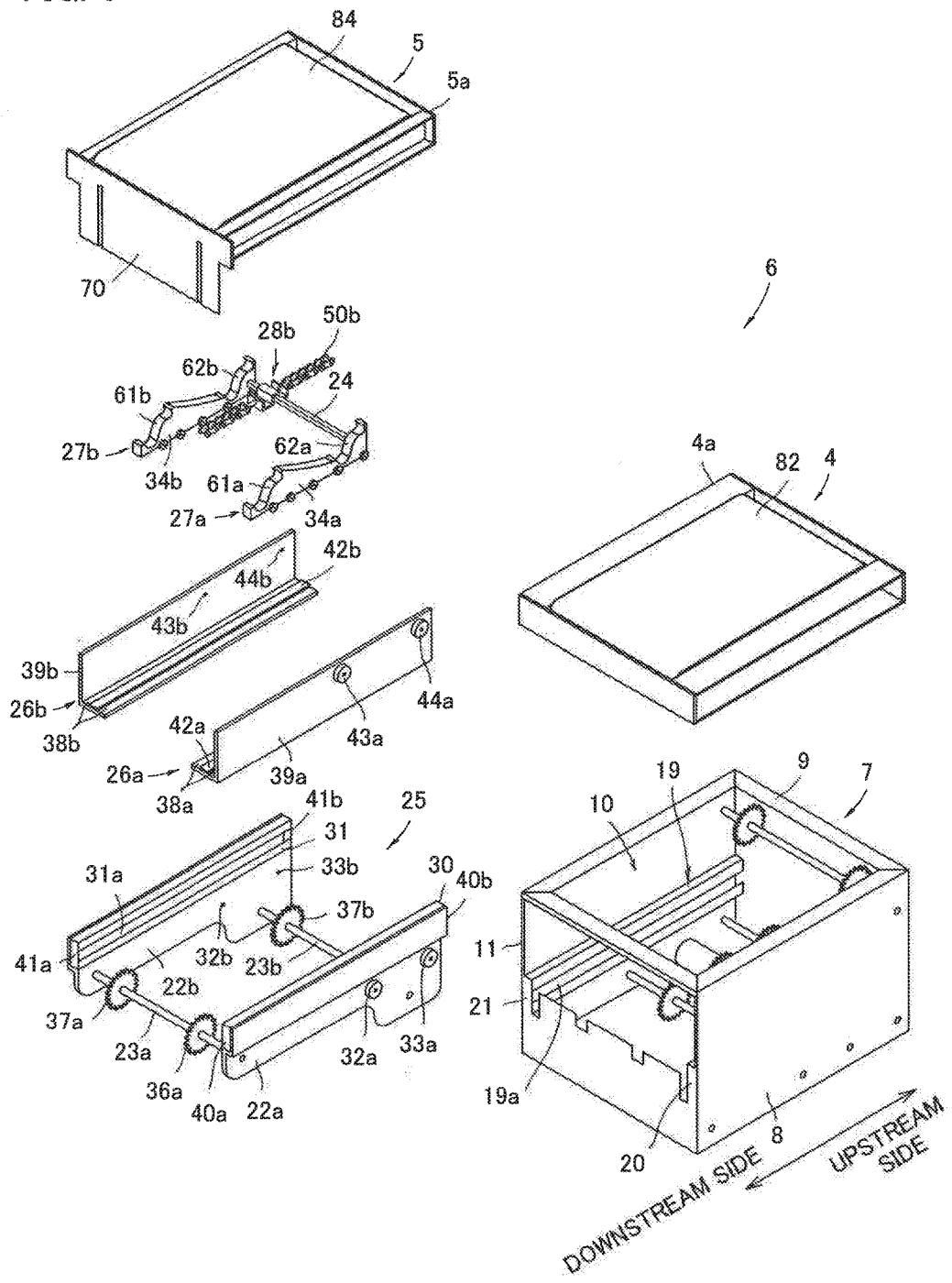
FIG. 6 is an exploded perspective view of the path forming device according to the embodiment of the present invention.

As illustrated in FIG. 6, the driving device 7 has a rectangular parallelepiped housing 8, an intermediate interposed member 25, receiving members 26a, 26b and engaging members 27a, 27b.

Figure 7:
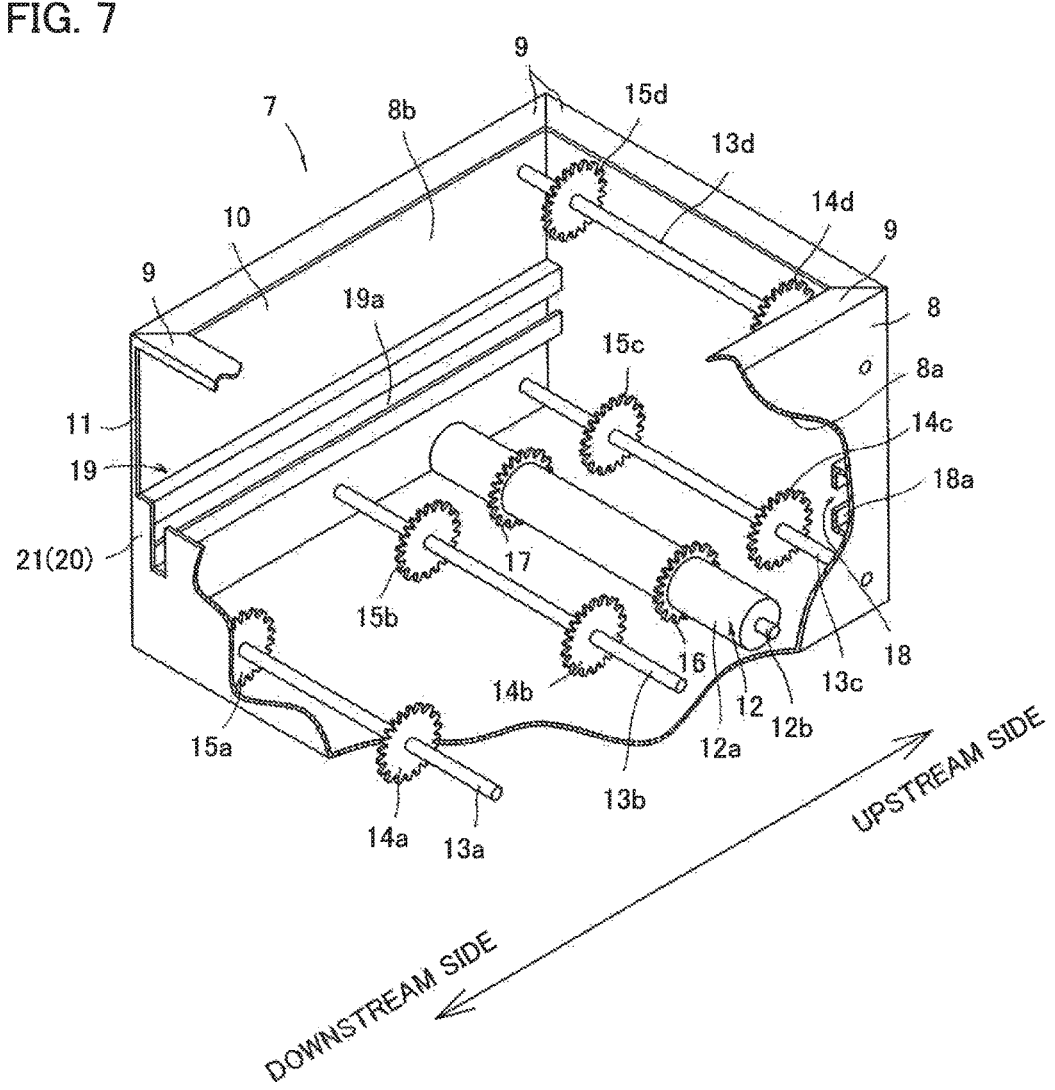
FIG. 7 is a perspective view illustrated by breaking a part of a driving device.

As illustrated in FIG. 7, a space 10 is formed inside the housing 8. An opening 11 is provided in a side surface on the downstream side in the conveying direction of the article W in the housing 8.

As illustrated in FIG. 7, in the space 10, a driving roller 12 (drive motor), sprocket support shafts 13a to 13d, and linear guides 18, 19 are installed. The sprocket support shafts 13a to 13c and the driving roller 12 are disposed at substantially the same height. The sprocket support shaft 13a, the sprocket support shaft 13b, the driving roller 12, and the sprocket support shaft 13c are disposed in this order from the downstream side in the conveying direction of the article W. Right above the sprocket support shaft 13c, the sprocket support shaft 13d is disposed.

The sprocket support shafts 13a to 13d are supported by the housing 8.

In the sprocket support shaft 13a, sprockets 14a, 15a are mounted at a predetermined interval. The sprockets 14a, 15a are similar sprockets, and are mounted on the sprocket support shaft 13a through a bearing (not illustrated). That is, the sprockets 14a, 15a are rotatable with respect to the sprocket support shaft 13a.

Similarly, in the sprocket support shafts 13b to 13d, sprockets 14b to 14d, 15b to 15d are mounted at predetermined intervals through bearings (not illustrated).

The driving roller 12 is a motor-incorporating roller, and has a roller body 12a and a shaft 12b. Inside the roller body 12a, a motor and a speed reducer (not illustrated) are disposed. The shaft 12b is fixed to the housing 8. Driving power of the motor is transmitted to the roller body 12a through the speed reducer. That is, when the motor is driven, the roller body 12a rotates. On an outer peripheral surface of the roller body 12a, sprockets 16, 17 are fixed at a predetermined interval. That is, the sprockets 16, 17 are rotatable integrally with the roller body 12a.

Figure 9:
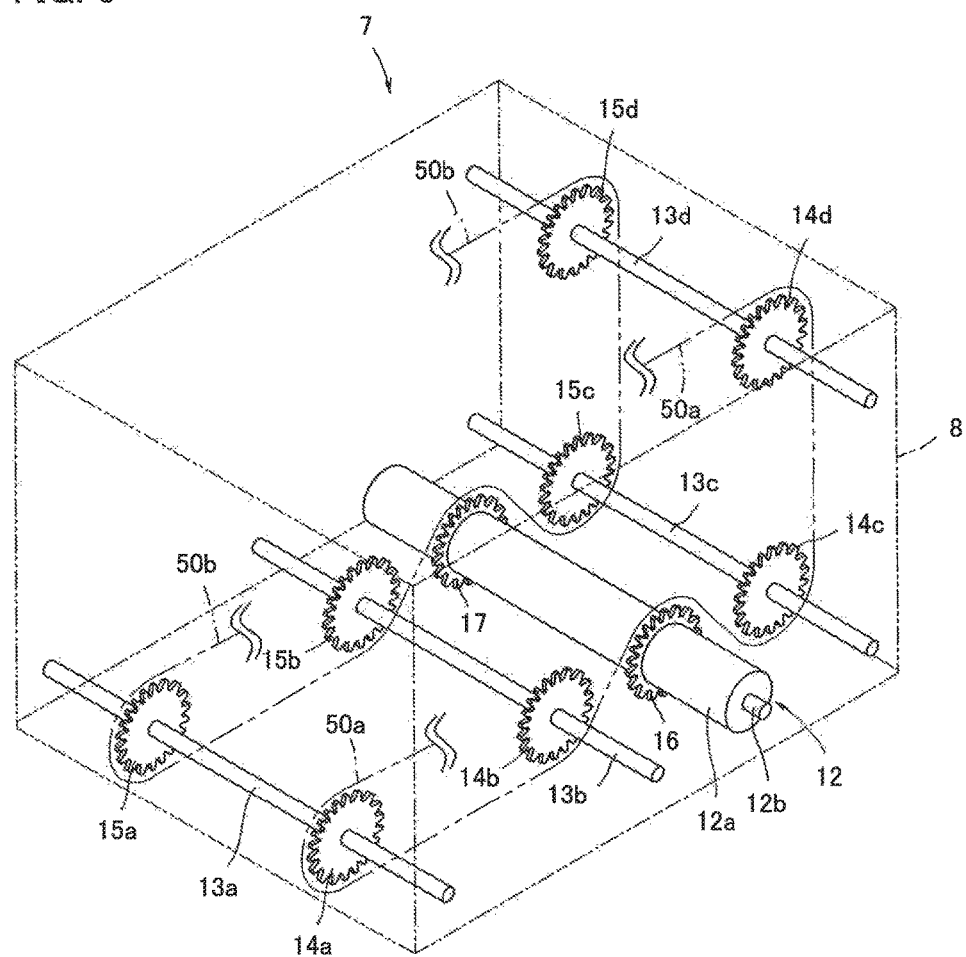
FIG. 9 is a perspective view illustrating a way to hook chains in the driving device.

As illustrated in FIG. 9, the sprockets 14a to 14d, and the sprocket 16 are disposed in the same vertical plane, and configures a series of chain driving mechanism including a chain 50a. Similarly; the sprockets 15a to 15d, and the sprocket 17 are disposed in another vertical plane, and configures a series of chain driving mechanism including a chain 50b.

The linear guides 18, 19 are disposed along inner surfaces of side walls 8a, 8b extending from the upstream side to the downstream side in the conveying direction of the article W in the housing 8. The linear guides 18, 19 are level, located at the same height, and face each other. Both ends of the linear guides 18, 19 are blocked. Particularly, downstream side ends of the linear guides 18, 19 are blocked by blocking members 20, 21.

Figure 10:
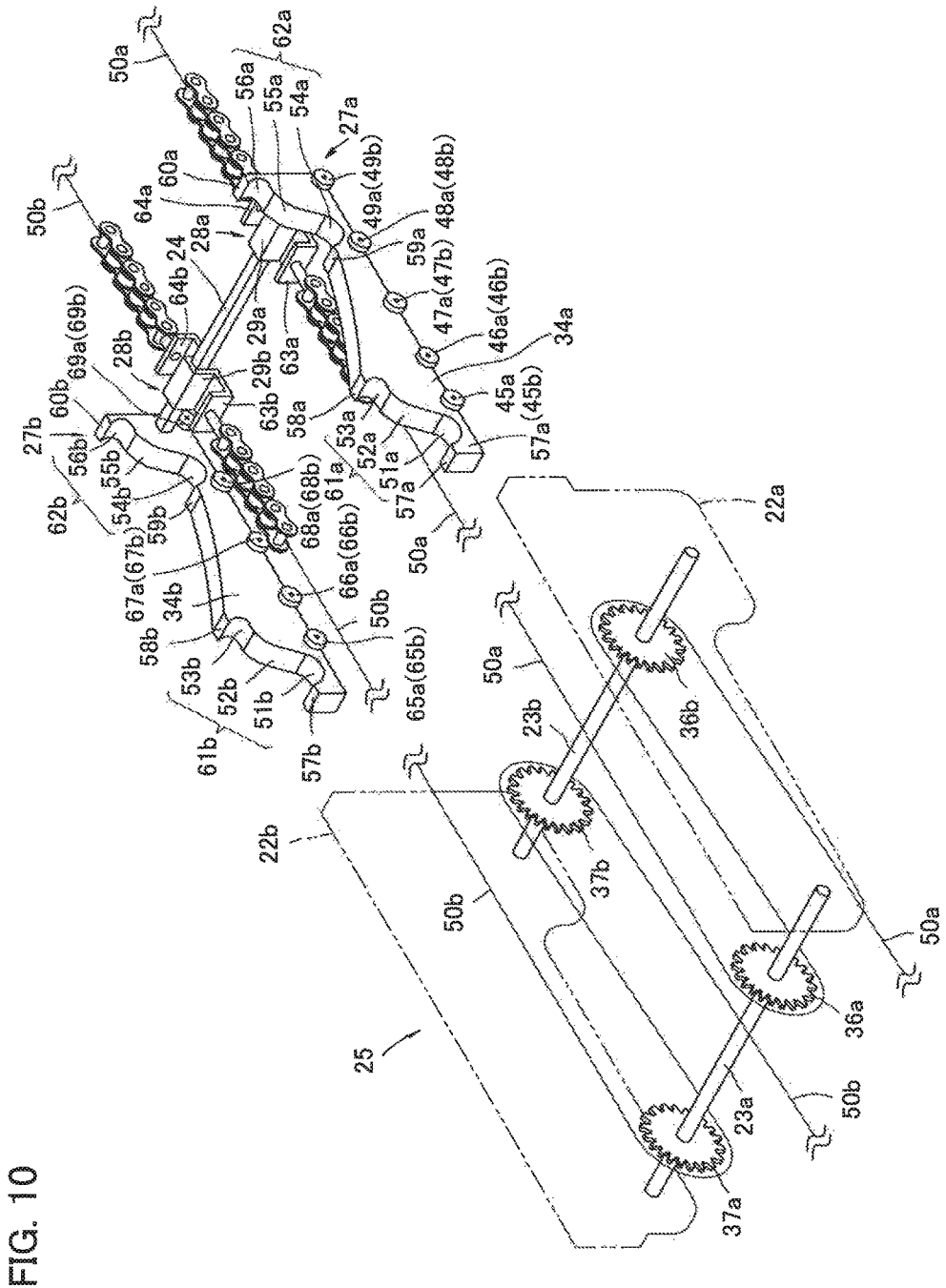
FIG. 10 is a perspective view of an intermediate interposed member and an engaging member, and illustrates a way to hook chains to the both members.

As illustrated in FIG. 6 and FIG. 10, the intermediate interposed member 25 has side plates 22a, 22b, and sprocket support shafts 23a, 23b.

The side plates 22a, 22b are plate members having the same shape and the same size, and has rigidity. The side plates 22a, 22b face each other in a vertical posture.

As illustrated in FIG. 6, a linear guide 31 is provided on a surface on a side opposite to the side plate 22a, in the side plate 22b. The linear guide 31 has a groove 31a, the groove 31a is fixed to the side plate 22b so as to extend from the upstream side to the downstream side in the conveying direction of the article W. Similarly, a linear guide 30 having a groove 30a (FIG. 11, FIG. 12) is fixed to the side plate 22a. The linear guides 30, 31 have the same length, are parallel to each other, and are located at the same height.

Blocking members 41a, 41b for closing the groove 31a are provided on both ends of the linear guide 31. Similarly, blocking members 40a, 40b for closing the groove 30a (FIG. 11, FIG. 12) are provided on both ends of the linear guide 30.

Rollers 32a, 33a are provided on a surface on a side opposite to a side where the linear guide 30 is provided, in the side plate 22a. The rollers 32a, 33a are disposed at the same height position. The roller 33a is disposed in the vicinity of an end on the upstream side in the conveying direction of the article W in the side plate 22a and the roller 32a is disposed at the center from the upstream side to the downstream side in the conveying direction of the article W in the side plate 22a, or at a position deviated on the upstream side with respect to the above center. Rollers 32b, 33b (only mounting central positions are illustrated in FIG. 6) are provided on the side plate 22b, similarly to the side plate 22a.

Figure 11:
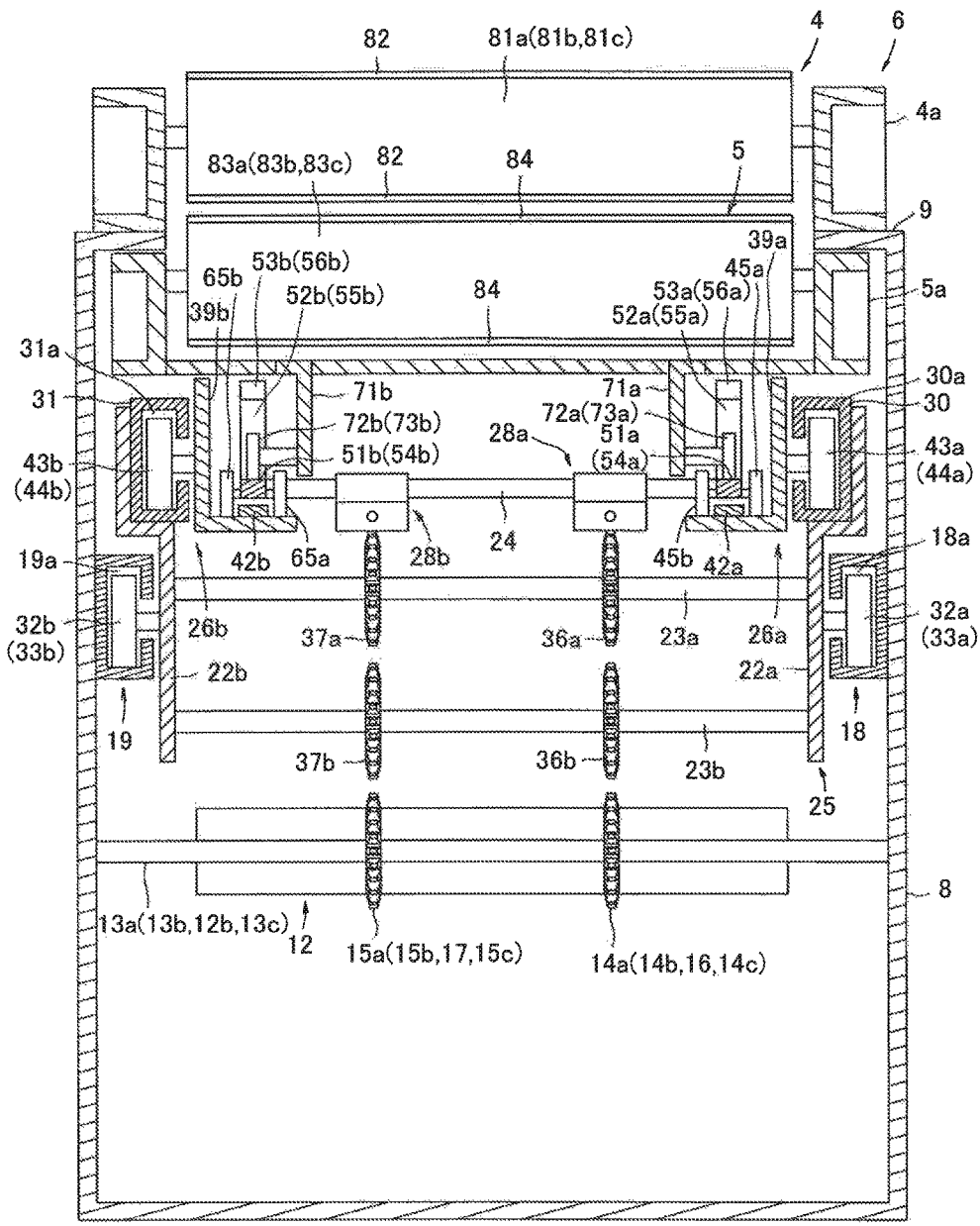
FIG. 11 is a front view illustrated by breaking a part of the path forming device, and illustrates a state where the movable side conveyor device lowers.

As illustrated in FIG. 11, an interval between the roller 32a of the side plate 22a and the roller 32b of the side plate 22b, and an interval between the roller 33a of the side plate 22a and the roller 33b of the side plate 22b coincide with an interval between a groove 18a of a linear guide 18 and a groove 19a of a linear guide 19 provided in the housing 8.

The sprocket support shafts 23a, 23b has the same length. Sprockets 36a, 37a are mounted on the sprocket support shaft 23a through a bearing (not illustrated), and sprockets 36b, 37b are mounted on the sprocket support shaft 23b through a bearing (not illustrated). An interval between the sprockets 36a, 37a, and an interval between the sprockets 36b, 37b coincide with an interval between the sprockets 14a, 15a mounted on the sprocket support shaft 13a of the housing 8.

The sprocket support shafts 23a, 23b are disposed between the side plates 22a, 22b, and both ends of each of the sprocket support shafts 23a, 23b are fixed to the side plates 22a, 22b. That is, the sprocket support shaft 23a is fixed to the vicinities of ends on the downstream side in the side plates 22a, 22b, and the sprocket support shaft 23b is fixed to the vicinities of ends on the upstream side in the side plates 22a, 22b. The sprocket support shaft 23a is disposed at a higher position than the sprocket support shaft 23b, and the heights of lowermost sections of the sprockets 36a, 37a coincide with the heights of uppermost sections of the sprockets 36b, 37b.

As illustrated in FIG. 6, the receiving members 26a, 26b are plate members extending from the upstream side to the downstream side in the conveying direction of the article W, and having L-shaped transverse sections, and have rigidity.

The receiving member 26a has a horizontal section 38a and a vertical section 39a orthogonal to each other. The horizontal section 38a is provided with a guide member 42a. The guide member 42a is a long and thin plate-like member having a narrower width than the horizontal section 38a. The guide member 42a is disposed at the center in the width direction of the horizontal section 38a. Therefore, the center in the width direction of the horizontal section 38a is covered with the guide member 42a, and both sides in the width direction of the horizontal section 38a are exposed. The exposed sections of the horizontal section 38a and the guide member 42a function as a rail for guiding the engaging member 27a described below.

The vertical section 39a is provided with rollers 43a, 44a. The rollers 43a, 44a are provided on the vertical section 39a, on a surface opposite to a side on which the horizontal section 38a is provided. The roller 44a is provided in the vicinity of an end on the upstream side in the conveying direction of the article W in the vertical section 39a. The roller 43a is provided at the center in the conveying direction of the article W in the vertical section 39a, or at a position deviated on the upstream side with respect to the above center. The rollers 43a, 44a are disposed at the same height position.

The receiving member 26b and the receiving member 26a are mirror-image members, but have similar configurations. That is, the receiving member 26b is a member in which a transverse section formed by a horizontal section 38b and a vertical section 39b orthogonal to each other has an L-shape. A guide member 42b is provided at the center in the width direction of the horizontal section 38b, and rollers 43b, 44b (only mounting central positions are illustrated in FIG. 6) are provided in the vertical section 39b.

As illustrated in FIG. 11, the receiving members 26a, 26b are disposed such that an interval between the roller 43a of the receiving member 26a and the roller 43b of the receiving member 26b, and an interval between the roller 44a of the receiving member 26a and the roller 44b of the receiving member 26b coincide with an interval between the groove 30a of the linear guide 30 and the groove 31a of a linear guide 31 of the intermediate interposed member 25.

As illustrated in FIG. 6, the receiving members 26a, 26b are disposed so as to extend horizontally and face in parallel to each other. The horizontal section 38a of the receiving member 26a is disposed on the receiving member 26b side. Similarly, the horizontal section 38b of the receiving member 26b is disposed on the receiving member 26a side.

As illustrated in FIG. 6 and FIG. 10, the engaging member 27a has a plate-like body 34a.

Figure 12:
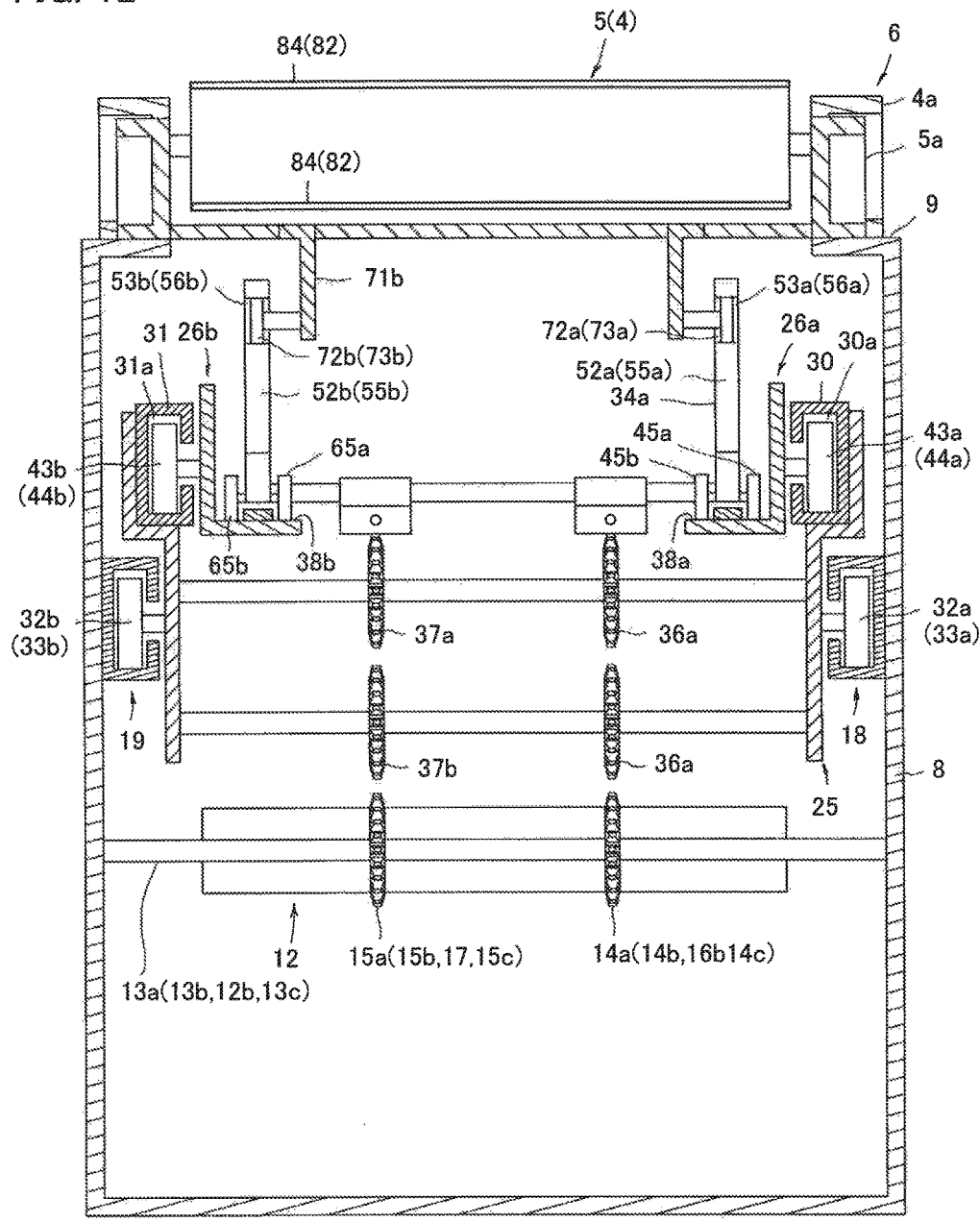
FIG. 12 is a front view illustrated by breaking a part of the path forming device, and illustrates a state where the movable side conveyor device rises.

A plurality of paired rollers 45a (45b), 46a (46b), 47a (47b), 48a (48b), 49a (49b) are provided in a lower section of the body 34a. That is, the rollers 45a to 49a are disposed on one of the sides in the width direction of the body 34a, and the rollers 45b to 49b (only the roller 45b is illustrated in FIG. 11 and FIG. 12) are disposed on the other side in the width direction. The respective rollers protrude below the body 34a. When the respective rollers are disposed on the ground, a clearance is generated between the lower section of the body 34a and the ground.

In an upper section of the body 34a, a downstream side engaging section 61a, and an upstream side engaging section 62a are provided in this order from the downstream side in the conveying direction of the article W.

The downstream side engaging section 61a has a downstream side lower recess 51a, a downstream side cam section 52a, and a downstream side upper recess 53a in this order from the downstream side in the conveying direction of the article W.

The downstream side lower recess 51a is a part recessed in an arc shape, and an erection section 57a is provided on the downstream side of the downstream side lower recess 51a.

The downstream side lower recess 51a and the downstream side cam section 52a, as well as the downstream side cam section 52a and the downstream side upper recess 53a are smoothly continued. The downstream side cam section 52a forms a convex smooth cam surface.

An erection section 58a is provided on the upstream side of the downstream side upper recess 53a.

The upstream side engaging section 62a has an upstream side lower recess 54a, an upstream side cam section 55a, and an upstream side upper recess 56a, and has a configuration similar to the configuration of the downstream side engaging section 61a.

That is, the upstream side lower recess 54a and the upstream side upper recess 56a correspond to the downstream side lower recess 51a and the downstream side upper recess 53a, respectively, and the upstream side cam section 55a has a cam surface having the same shape and the same size as the downstream side cam section 52a.

An erection section 59a is provided on the downstream side of the upstream side lower recess 54a, and an erection section 60a is provided on the upstream side of the upstream side upper recess 56a.

The engaging member 27b also has the same configuration as the engaging member 27a.

That is, the engaging member 27b has a plate-like body 34b, and rollers 65a (65b), 66a (66b), 67a (67b), 68a (68b), 69a (69b) that are wheels. Additionally, the body 34b is provided with a downstream side engaging section 61b and an upstream side engaging section 62b. Hereinafter, repeated description will be omitted.

The engaging members 27a, 27b face each other, and are connected by a connection member 24. The connection member 24 is a long and thin square columnar shaped member. In the connection member 24, coupling members 28a, 28b are installed. That is, the coupling members 28a, 28b are provided with fixing sections 29a, 29b for fixing the connection member 24, respectively. The coupling members 28a, 28b each are a member formed by bending a plate-like member at a plurality of portions, and the fixing sections 29a, 29b each have a U-shaped transverse section. The connection member 24 is housed in these U-shaped parts of the fixing sections 29a, 29b, so that the coupling members 28a, 28b, and the connection member 24 are engaged with each other.

Downstream side connection sections 63a, 63b, and upstream side connection sections 64a, 64b are provided on the both sides of the fixing sections 29a, 29b in the coupling members 28a, 28b respectively.

One end of the chain 50a (annular member) is connected to the downstream side connection section 63a of the coupling member 28a, and the other end of the chain 50a (annular member) is connected to the upstream side connection section 64a of the coupling member 28a.

Similarly, one end of the chain 50b (annular member) is connected to the downstream side connection section 63b of the coupling member 28b, and the other end of the chain 50b (annular member) is connected to the upstream side connection section 64b of the coupling member 28b.

The chains 50a, 50b will be described below.

The movable side conveyor device 5 is a belt conveyor device including a frame-shaped housing 5a, a driving pulley 83a, and a driven pulley 83b. A plurality of rollers 83c are disposed between the driving pulley 83a and the driven pulley 83b. Respective shafts of the driving pulley 83a, the driven pulley 83b, and the plurality of rollers 83c are fixed to the housing 5a.

Figure 8:
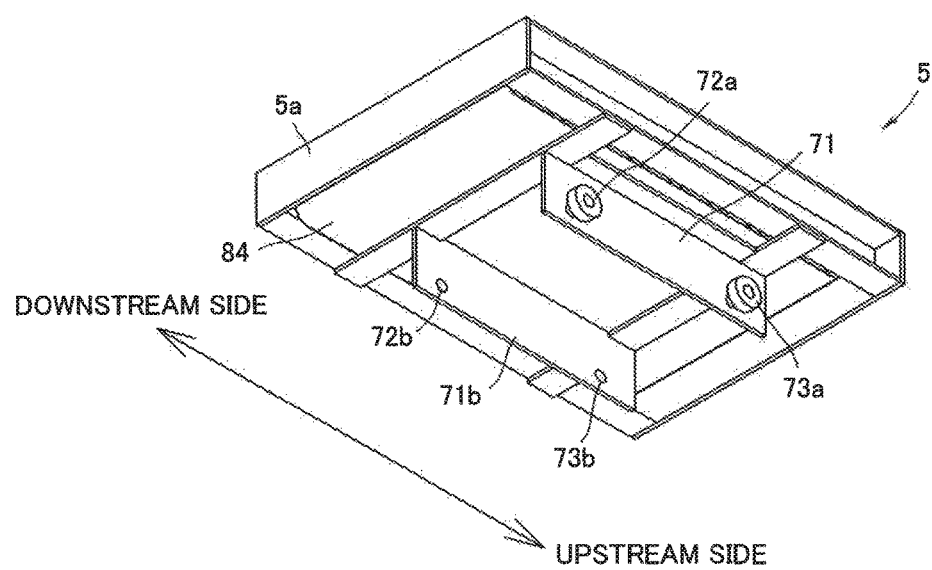
FIG. 8 is a perspective view viewed from below the movable side conveyor device.

As illustrated in FIG. 8, a pair of long and thin plate-like support members 71a, 71b are provided in the lower section of the housing 5a of the movable side conveyor device 5. The support members 71a, 71b face each other, and are disposed in an erect posture so as to extend from the upstream side to the downstream side in the conveying direction of the article W in the movable side conveyor device 5.

The support member 71a is provided with rollers 72a, 73a. The roller 72a is provided in the vicinity of an end on the downstream side in the conveying direction of the article W in the support member 71a, and the roller 73a is provided in the vicinity of an end on the upstream side in the conveying direction of the article W in the support member 71a.

Similarly, the support member 71b is provided with rollers 72b, 73b (FIG. 11, FIG. 12) in this order from the downstream side.

An interval between the rollers 72a, 73a of the support member 71a is the same as an interval between the downstream side engaging section 61a and the upstream side engaging section 62a of the engaging member 27a. The diameter of the roller 72a coincides with the inner diameter of the downstream side lower recess 51a and the inner diameter of the downstream side upper recess 53a of the engaging member 27a. The diameter of the roller 73a coincides with the inner diameter of the upstream side lower recess 54a and the inner diameter of the upstream side upper recess 56a of the engaging member 27a.

Similarly, an interval between the rollers 72b, 73b of the support member 71b is the same as an interval between the downstream side engaging section 61b and the upstream side engaging section 62b of the engaging member 27b. The diameter of the roller 72b coincides with the inner diameter of the downstream side lower recess 51b and the inner diameter of a downstream side upper recess 53b of the engaging member 27b. The diameter of the roller 73b coincides with the inner diameter of the downstream side lower recess 54b and the inner diameter of the downstream side upper recess 56b of the engaging member 27b.

Furthermore, an interval between the roller 72a of the support member 71a and the roller 72b of the support member 71b coincides with an interval between the engaging member 27a (body 34a) and the engaging member 27b (body 34b) as illustrated in FIG. 12.

A lid member 70 is provided on a downstream side end of the movable side conveyor device 5.

Now, the engagement relation of the respective members of the path forming device 6 will be described.

The fixed side conveyor device 4 is placed on a flange section 9 of the housing 8 of the driving device 7, and the housing 8 and the fixed side conveyor device 4 are integrally fixed by fixing means such as screwing.

The intermediate interposed member 25 is disposed in the space 10 inside the housing 8 of the driving device 7. The rollers 32a, 33a of the intermediate interposed member 25 are fitted in the groove 18a of the linear guide 18 fixed to the housing 8, as illustrated in FIG. 11. The rollers 32a, 33a are movable along the groove 18a of the linear guide 18.

Figure 5:
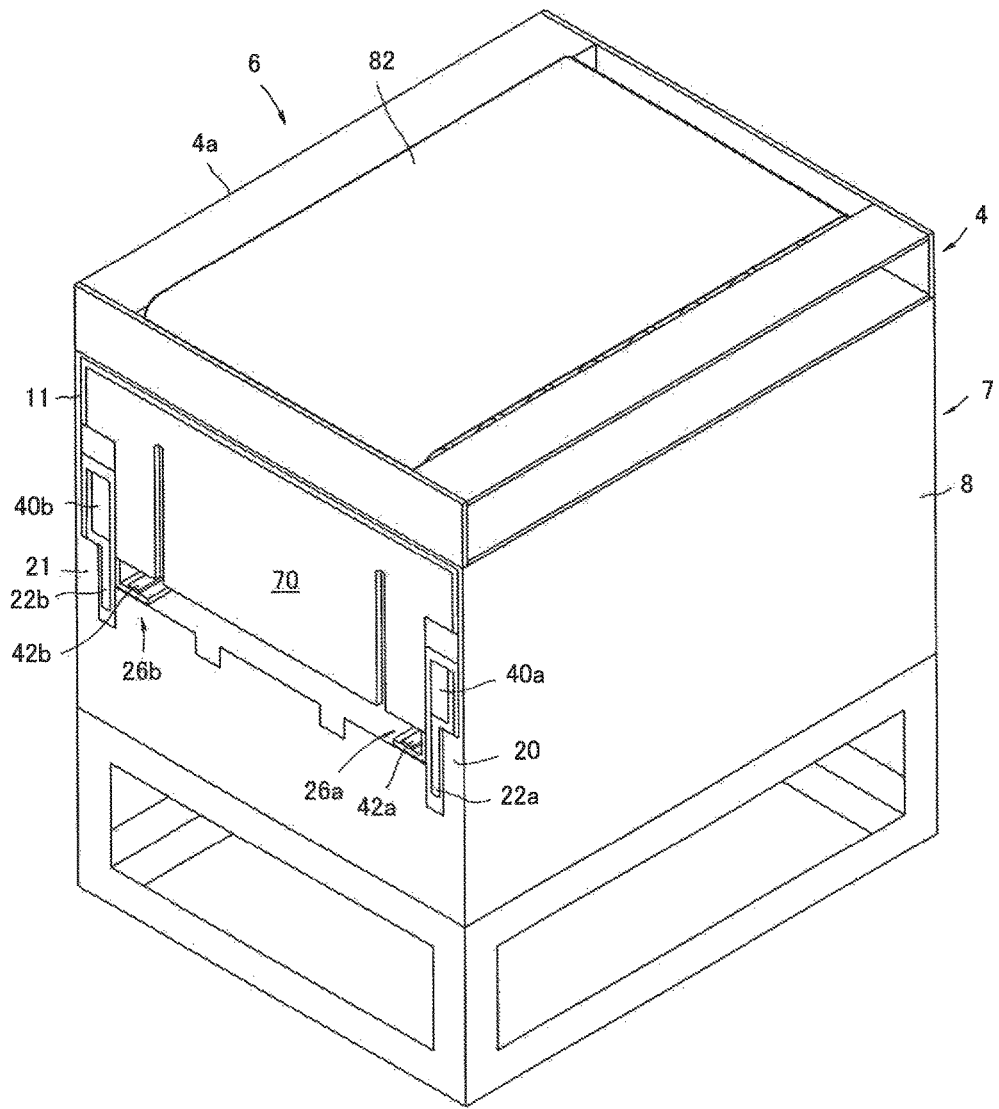
FIG. 5 is a perspective view of the path forming device according to the embodiment of the present invention, and illustrates the path opening posture in which the movable side conveyor device is housed in the fixed side conveyor device.

As illustrated in FIG. 11, the rollers 32b, 33b of the intermediate interposed member 25 are fitted in the groove 19a of the linear guide 19 fixed to the housing 8. The rollers 32b, 33b are movable along the groove 19a of the linear guide 19. Accordingly, the intermediate interposed member 25 can move from the upstream side to the downstream side, or the direction opposite to the above, with respect to the housing 8. When the intermediate interposed member 25 moves to the downstream side, a part of the intermediate interposed member 25 protrudes from the opening 11 of the housing 8 (FIG. 1, FIG. 4). To the contrary, when the intermediate interposed member 25 moves to the upstream side, the intermediate interposed member 25 is housed in the housing 8 (FIG. 2, FIG. 5).

When the rollers 32a, 32b of the intermediate interposed member 25 come into contact with the blocking members 20, 21 (movement preventing units) provided in the linear guides 18, 19, respectively, the intermediate interposed member 25 stops. That is, when the rollers 32a, 32b come into contact with the blocking members 20, 21, respectively, the intermediate interposed member 25 cannot protrude from the housing 8 anymore. That is, the blocking members 20, 21 have a function for preventing the intermediate interposed member 25 from falling off the housing 8.

When the intermediate interposed member 25 is mounted on the housing 8, the sprockets 14a to 14d and the sprocket 16 on the housing 8 side, and the sprockets 36a, 36b on the intermediate interposed member 25 side are disposed in the same vertical plane. Similarly, the sprockets 15a to 15d and the sprocket 17 on the housing 8 side, and the sprockets 37a, 37b on the intermediate interposed member 25 side are disposed in another same vertical plane.

The chain 50a (annular member) is suspended on the sprockets 14a to 14d, 16 on the housing 8 side disposed in the same vertical plane, and the sprockets 36a, 36b on the intermediate interposed member 25 side. The chain 50b (annular member) is suspended on the sprockets 15a to 15d, 17 on the housing 8 side disposed in another same vertical plane, and the sprockets 37a, 37b on the intermediate interposed member 25 side.

The respective ways to suspend the chains 50a, 50b are illustrated in FIG. 9 and FIG. 10. That is, as illustrated in FIG. 10, one end of the chain 50a is connected to the downstream side connection section 63a of the coupling member 28a engaged with the connection member 24. The chain 50a passes through the sprockets 36a, 36b of the intermediate interposed member 25, and the sprockets 14a, 14b, 16, 14c, 14d inside the housing 8 from the downstream side connection section 63a. Then, the other end of the chain 50a is connected to the upstream side connection section 64a of the coupling member 28a engaged with the connection member 24.

That is, the chain 50a extends in the downstream direction from the downstream side connection section 63a of the coupling member 28a, and is suspended on the sprocket 36a of the intermediate interposed member 25, so that the direction of the chain 50a is reversed, and the chain 50a extends in the upstream direction. Then the direction of the chain 50a is reversed at the sprocket 36b, and the chain 50a extends in the downstream direction. The chain 50a is suspended on the sprocket 14a on the driving device 7 side, so that the direction of the chain 50a is reversed and the chain 50a extends in the upstream direction, and passes through below the sprocket 14b, above the sprocket 16, and below the sprocket 14c to extend upward. Then, the direction of the chain 50a is directed in the downstream direction at the sprocket 14d, and the other end is connected to the upstream side connection section 64a of the coupling member 28a. The chain 50a moves downward through the sprockets 36a, 36b, 14a in this order.

The chain 50a shows no flexure.

Similarly, one end of the chain 50b is connected to the downstream side connection section 63b of the coupling member 28b engaged with the connection member 24. The chain 50b passes through the sprockets 37a, 37b of the intermediate interposed member 25, and the sprockets 15a, 15b, 17, 15c, 15d inside the housing 8 from the downstream side connection section 63b. Then, the other end of the chain 50b is connected to the upstream side connection section 64b of the coupling member 28b engaged with the connection member 24.

That is, the chain 50b extends in the downstream direction from the downstream side connection section 63b of the coupling member 28b, and is suspended on the sprocket 37a of the intermediate interposed member 25, so that the direction of the chain 50b is reversed, and the chain 50b extends in the upstream direction. Then, the direction of the chain 50a is reversed at the sprocket 37b, and the chain 50b extends in the downstream direction. The chain 50b is suspended on the sprocket 15a on the driving device 7 side, so that the direction of the chain 50b is reversed and the chain 50b extends in the upstream direction, and passes through below the sprocket 15b, above the sprocket 17, and below the sprocket 15c to extend upward. Then, the direction of the chain 50ba is directed in the downstream direction at the sprocket 15d, and the other end is connected to the upstream side connection section 64b of the coupling member 28b. The chain 50b moves downward through the sprockets 37a, 37b, 15a in this order.

The chain 50b shows no flexure.

The rollers 43a (44a), 43b (44b) of the receiving members 26a, 26b are engaged with the linear guides 30, 31 of the intermediate interposed member 25. That is, the rollers 43a, 44a of the receiving member 26a are fitted in the groove 30a of the linear guide 30. Similarly, the rollers 43b, 44b of the receiving member 26b are fitted in the groove 31a of the linear guide 31.

Furthermore, the rollers 45a (45b), 46a (46b), 47a (47b), 48a (48b), 49a (49b) of the engaging member 27a are placed on the horizontal section 38a of the receiving member 26a. The rollers 45a, 46a, 47a, 48a, 49a are disposed on one side of the guide member 42a, and the rollers 45b, 46b, 47b, 48b, 49b are disposed on the other side of the guide member 42a. Therefore, the respective rollers can reciprocate along the guide member 42a, and the horizontal section 38a and the guide member 42a have a function as a rail for guiding the respective rollers.

Similarly, the rollers 65a (65b), 66a (66b), 67a (67b), 68a (68b), 69a (69b) of the engaging member 27b are placed on the horizontal section 38b of the receiving member 26b. The rollers 65a, 66a, 67a, 68a, 69a are disposed on one side of the guide member 42b, and the rollers 65b, 66b, 67b, 68b, 69b are disposed on the other side of the guide member 42b. Therefore, the respective rollers can reciprocate along the guide member 42b, and the horizontal section 38b and the guide member 42b have a function as a rail for guiding the respective rollers.

The rollers 72a, 72b of the movable side conveyor device 5 are engaged with (placed on) the downstream side engaging section 61a, 61b of the engaging members 27a, 27b, respectively. Similarly, the rollers 73a, 73b of the movable side conveyor device 5 are engaged with (placed on) the upstream side engaging section 62a, 62b of the engaging members 27a, 27b respectively.

Now, operation of the path forming device 6 will be described.

Figure 13A:
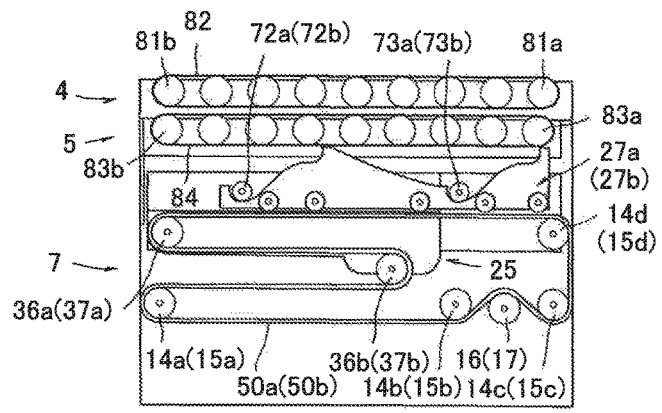
Figure 13B:
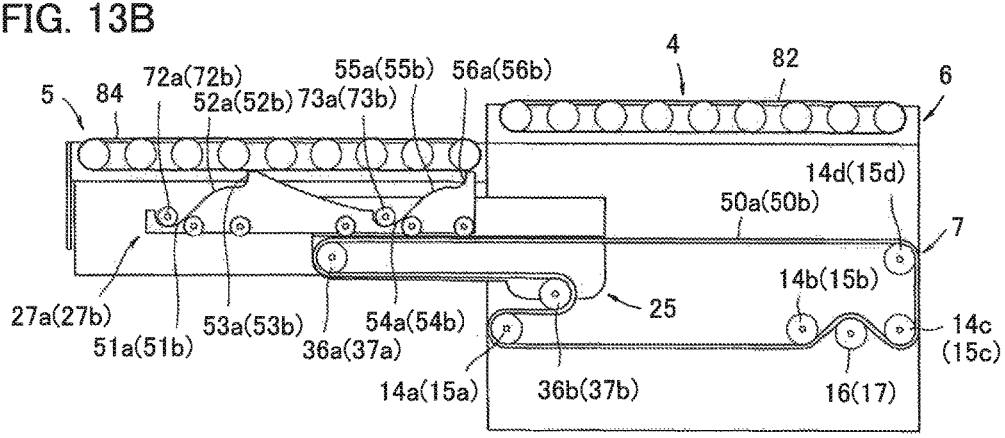
Figure 13C:
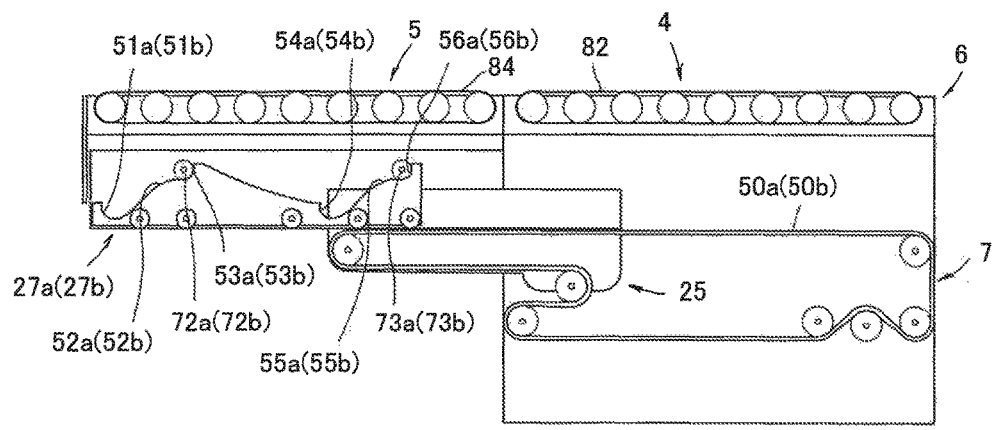

The path forming device 6 can take a path opening posture illustrated in FIG. 5 and FIG. 13A, and an article conveying posture illustrated in FIG. 4 and FIG. 13C.

As illustrated in FIG. 13A, in the path opening posture, the movable side conveyor device 5 is housed below the fixed side conveyor device 4, that is, inside the housing 8.

At this time, the intermediate interposed member 25 is also housed inside the housing 8. Inside the housing 8, the rollers 33a, 33b of the intermediate interposed member 25 are located in the vicinity of upstream side ends of the linear guides 18, 19, respectively.

Additionally, the receiving members 26a, 26b are also housed inside the housing 8. The roller 44a of the receiving member 26a comes into contact with the blocking member 40b on the upstream side of the linear guide 30 of the intermediate interposed member 25 to stop. Similarly, the roller 44b of the receiving member 26b comes into contact with the blocking member 41b on the upstream side of the linear guide 31 of the intermediate interposed member 25 to stop Furthermore, the engaging members 27a, 27b stop at ends on the upstream side of the horizontal sections 38a, 38b of the receiving members 26a, 26b, respectively.

The rollers 72a, 72b of the movable side conveyor device 5 are engaged with the downstream side lower recesses 51a, 51b of the engaging members 27a, 27b, and the rollers 73a, 73b are engaged with the upstream side lower recesses 54a, 54b of the engaging members 27a, 27b, respectively. The downstream side cam sections 52a, 52b are continuously provided on the upstream sides of the downstream side lower recesses 51a, 51b, respectively, and the upstream side cam sections 55a, 55b are continuously provided on the upstream sides of the upstream side lower recesses 54a, 54b. Therefore, as long as significantly large force does not act between the rollers 72a, 72b, 73a, 73b and the engaging members 27a, 27b, the rollers 72a, 72b do not move upward along the downstream side cam sections 52a, 52b, and the rollers 73a, 73b do not move upward along the upstream side cam sections 55a, 55b. That is, the movable side conveyor device 5, and the engaging members 27a, 27b integrally move from the upstream side to the downstream side.

More specifically, when the engaging members 27a, 27b are pulled to the downstream side by the chains 50a, 50b, respectively, the rollers 43a, 44a of the receiving member 26a and the rollers 43b, 44b of the receiving member 26b first move along the linear guides 30, 31 of the intermediate interposed member 25, respectively. When the rollers 43a, 43b collide with the blocking member 40a, 41a of the linear guides 30, 31, respectively, movement of the receiving members 26a, 26b with respect to the intermediate interposed member 25 stops. At this time, the movable side conveyor device 5 moves integrally with the engaging members 27a, 27b from the upstream side to the downstream side.

When the engaging members 27a, 27b are further pulled to the downstream side by the chains 50a, 50b, respectively, the rollers 32a, 33a, 32b, 33b of the intermediate interposed member 25 move along the linear guides 18, 19 of the housing 8. When the rollers 32a, 32b collide with the blocking members 20, 21, respectively, movement of the intermediate interposed member 25 with respect to the housing 8 stops. At this time, the movable side conveyor device 5 moves integrally with the engaging members 27a, 27b and the intermediate interposed member 25 from the upstream side to the downstream side.

Then, when the engaging members 27a, 27b are further pulled to the downstream side by the chains 50a, 50b, respectively, only the engaging members 27a, 27b move on the downstream side, and the movable side conveyor device 5 does not move to the downstream side.

That is, the engaging members 27a, 27b move to the downstream side with respect to the movable side conveyor device 5. The downstream side cam sections 52a, 52b of the engaging members 27a, 27b pass under the rollers 72a, 72b of the movable side conveyor device 5, and lift the rollers 72a, 72b of the movable side conveyor device 5. The upstream side cam sections 55a, 55b of the engaging members 27a, 27b pass under the rollers 73a, 73b of the movable side conveyor device 5, and lift the rollers 73a, 73b of the movable side conveyor device 5. Accordingly, the movable side conveyor device 5 rises at the same height as the fixed side conveyor device 4.

At this time, the movable rollers 72a, 72b, 73a, 73b of the movable side conveyor device 5 are engaged with the downstream side upper recesses 53a, 53b and the upstream side upper recesses 56a, 56b of the engaging members 27a, 27b, respectively. That is, the height position where the movable side conveyor device 5 rises is fixed.

When the chains 50a, 50b are driven so as to run from the downstream side to the upstream side, the engaging members 27a, 27b move from the downstream side to the upstream side. At this time, the rollers 72a, 72b, 73a, 73b of the movable side conveyor device 5 are disengaged from the downstream side upper recesses 53a, 53b and the upstream side upper recesses 56a, 56b of the engaging members 27a, 27b, respectively, and further lower along the downstream side cam sections 52a, 52b and upstream side cam sections 55a, 55b to be engaged with the downstream side lower recesses 51a, 51b and the upstream side lower recesses 54a, 54b, respectively.

The erection sections 57a, 57b are provided on the downstream side of the downstream side lower recesses 51a, 51b. The erection sections 57a, 57b function as stoppers of preventing movement of the rollers 72a, 72b to the downstream side. Similarly, the erection sections 59a, 59b are provided on the downstream side of the upstream side lower recesses 54a, 54b. The erection sections 59a, 59b function as stoppers of preventing movement of the rollers 73a, 73b to the downstream side.

Therefore, when the engaging members 27a, 27b move from the downstream side to the upstream side, the rollers 72a, 72b, 73a, 73b of the movable side conveyor device 5 are pushed by the erection sections 57a, 57b, 59a, 59b. As a result, the movable side conveyor device 5 moves integrally with the engaging members 27a, 27b from the downstream side to the upstream side.

Then, the movable side conveyor device 5 is housed inside the housing 8, and the lid member 70 closes the opening 11 (FIG. 5, FIG. 6) of the housing 8.

When the path forming device 6 changes the posture from the path opening posture to the article conveying posture, the driving roller 12 (sprockets 16, 17) of the driving device 7 is driven, and the engaging members 27a, 27b coupled to the chains 50a, 50b are made to move in the downstream direction.

As illustrated in FIG. 13B, the engaging member 27a (27b) are pulled by the chains 50a, 50b to move to the downstream side. At this time, the receiving members 26a, 26b also move to the downstream side along with the engaging members 27a, 27b, protrude from the housing 8, and protrude in a cantilever state. Additionally, the movable side conveyor device 5 engaged with the engaging members 27a, 27b through the rollers 72a, 72b, 73a, 73b also move along with the engaging members 27a, 27b to the downstream side.

At the same time, the intermediate interposed member 25 also moves to the downstream side to protrude from the housing 8. The protruding amount of the intermediate interposed member 25 from the housing 8 is a half of the protruding amount of the movable side conveyor device 5. That is, the chains 50a, 50b are suspended on the respective sprockets such that the protruding amount of the movable side conveyor device 5 is twice the protruding amount of the intermediate interposed member 25.

Even when the path forming device 6 is brought into the state illustrated in FIG. 13B from the state illustrated in FIG. 13A, the receiving members 26a, 26b and the engaging members 27a, 27b do not relatively move. That is, although the engaging members 27a, 27b are pulled by the chains 50a, 50b to move, frictional force larger than frictional force in movement of the rollers 43a, 43b along the linear guides 30, 31 acts between the rollers (wheels) 45a to 49a (45b to 49b) of the engaging members 27a, 27b, and the horizontal sections 38a, 38b of the receiving members 26a, 26b, and the rollers (wheels) 45a to 49a (45b to 49b) do not run on the horizontal sections 38a, 38b of the receiving members 26a, 26b. The engaging members 27a, 27b and the receiving members 26a, 26b integrally move to the downstream side to be brought into the state illustrated in FIG. 13B. That is, the engaging members 27a, 27b can be engaged with the movable side conveyor device 5 to push and pull the movable side conveyor device 5.

At this time, the rollers 32a, 32b of the intermediate interposed member 25 come into contact with the blocking members 20, 21 (movement preventing units), and movement of the intermediate interposed member 25 to the downstream side is stopped. As illustrated in FIG. 13B, the substantially half of the length of the intermediate interposed member 25 protrudes from the housing 8.

The whole lengths of the receiving member 26a and the movable side conveyor device 5 protrude from the housing 8. At this time, the rollers 43a, 43b of the receiving members 26a, 26b move up to downstream side ends of the linear guides 30, 31 of the intermediate interposed member 25, and come into contact with the blocking member 40a, 41a to stop.

Herein, a linear movement function for linearly moving the movable side conveyor device 5 with respect to the housing 8 is composed of the downstream side lower recesses 51a, 51b of the downstream side engaging section 61a, 61b and the upstream side lower recesses 54a, 54b of the upstream side engaging section 62a, 62b of the engaging members 27a, 27b. That is, the rollers 72a, 72b, 73a, 73b of the movable side conveyor device 5 are engaged with the downstream side lower recesses 51a, 51b and the upstream side lower recesses 54a, 54b of the engaging members 27a, 27b, and the engaging members 27a, 27b and the movable side conveyor device 5 integrally move in the linear direction (horizontal direction).

In the state illustrated in FIG. 13B, while the movable side conveyor device 5 protrudes from the housing 8, the height of the conveying surface of the movable side conveyor device 5 is lower than the height of the conveying surface of the fixed side conveyor device 4.

Herein, the rollers 43a, 43b of the receiving members 26a, 26b are in contact with the blocking members 40a, 40b, respectively, and the receiving members 26a, 26b cannot move to the downstream side with respect to the intermediate interposed member 25 anymore (terminal position). That is, the receiving members 26a, 26b reliably stop at the terminal position where the movable side conveyor device 5 protrudes from the housing 8 (fixed side conveyor device 4 side) in the cantilever state as much as possible. At this time, the fixed side conveyor device 4 and the movable side conveyor device 5 do not overlap with each other in plan view. Therefore, when the chains 50a, 50b are further driven, this overcomes frictional force between the rollers (wheels) 45a to 49a (45b to 49b) of the engaging members 27a, 27b and the horizontal sections 38a, 38b of the receiving members 26a, 26b. Thus, the engaging members 27a, 27b start relative movement with respect to the receiving members 26a, 26b.

When the engaging members 27a, 27b move along the receiving members 26a, 26b, the rollers 72a, 72b of the movable side conveyor device 5 move upward from the downstream side lower recesses 51a, 51b to the downstream side upper recesses 53a, 53b along the downstream side cam sections 52a, 52b of the engaging members 27a, 27b respectively. Similarly, the rollers 73a, 73b of the movable side conveyor device 5 move upward from the upstream side lower recesses 54a, 54b to the upstream side upper recesses 56a, 56b along the upstream side cam sections 55a, 55b of the engaging members 27a, 27b, respectively.

That is, the rollers 72a, 72b, 73a, 73b are lifted to move from the height position illustrated in FIG. 13B to the height position illustrated in FIG. 13C. As a result, as illustrated in FIG. 13C, the movable side conveyor device 5 rises, and the height of the conveying surface of the movable side conveyor device 5 is even with the height of the conveying surface of the fixed side conveyor device 4. At this time, the path forming device 6 takes the article conveying posture illustrated in FIG. 4.

Herein, a lifting and lowering function is composed of the downstream side cam sections 52a, 52b of the downstream side engaging section 61a, 61b, and the upstream side cam sections 55a, 55b of the upstream side engaging section 62a, 62b of the engaging members 27a, 27b.

When the posture is changed from the article conveying posture to the path opening posture, a procedure inverse to the above operation is performed. That is, the driving roller 12 is driven in the reverse direction, and the engaging members 27a, 27b are pulled to the upstream side of the conveying direction of the article W by the chains 50a, 50b. As a result, the rollers 72a, 72b, 73a, 73b of the movable side conveyor device 5 lower along the downstream side cam sections 52a, 52b and the upstream side cam sections 55a, 55b, and move from the downstream side upper recesses 53a, 53b and the upstream side upper recesses 56a, 56b to the downstream side lower recesses 51a, 51b and the upstream side lower recesses 54a, 54b, respectively, so that the movable side conveyor device 5 lowers as illustrated in FIG. 13B.

When the engaging members 27a, 27b are further pulled to the upstream side, the receiving members 26a, 26b move to the upstream side along with the engaging members 27a, 27b, respectively, and the roller 44a, 44b of the receiving members 26a, 26b come into contact with the blocking members 40b, 41b of the linear guides 30, 31 of the intermediate interposed member 25, respectively. Thereafter, the rollers 32a, 32b, 33a, 33b of the intermediate interposed member 25 move along the linear guides 18, 19 of the housing 8, and the engaging members 27a, 27b, the receiving members 26a, 26b, and the intermediate interposed member 25 integrally move to the upstream side. As a result, the path forming device 6 takes the path opening posture illustrated in FIG. 13A.

Now, the use form of the path forming device 6 will be described.

The path forming device 6 forms a part of the conveying passage of the conveying device 1, as described above.

As illustrated in FIG. 1, in the path forming device 6, the movable side conveyor device 5 is disposed on the downstream side of the fixed side conveyor device 4. FIG. 1 illustrates the article conveying posture of the path forming device 6, the respective rollers of the upstream side conveyor 2, the height of the conveying surface formed by a belt 82 of the fixed side conveyor device 4, and the height of the conveying surface formed by a belt 84 of the movable side conveyor device 5 coincide with each other.

That is, as illustrated in FIG. 13C, in the path forming device 6, the fixed side conveyor device 4 and the movable side conveyor device 5 are adjacent to each other, and the belt 82 and the belt 84 are disposed to be continuously lined in the horizontal direction.

As illustrated in FIG. 1, the article W on the upstream side conveyor 2 is conveyed to the path forming device 6 on the downstream side by the upstream side conveyor 2, and moves on the fixed side conveyor device 4. The article W passes through the fixed side conveyor device 4 and the movable side conveyor device 5, and is further conveyed to the downstream side by the downstream side conveyor 3. The belt 82 of the fixed side conveyor device 4 and the belt 84 of the movable side conveyor device 5 may always run. However, approach of the article W may be detected by a sensor, and the belt 82 of the fixed side conveyor device 4 and the belt 84 of the movable side conveyor device 5 may run only when the article W approaches.

When the article W is conveyed, in the path forming device 6, the movable side conveyor device 5 is disposed adjacent to the fixed side conveyor device 4, and the fixed side conveyor device 4 and the movable side conveyor device 5 form continuous belt conveyor devices, as illustrated in FIG. 1 and FIG. 4. The article W moves from the upstream side conveyor 2 to the downstream side conveyor 3 through the path forming device 6. The movable side conveyor device 5 has rigidity, and therefore is not distorted even when the article W is placed, and the height of the conveying surface does not change.

On the other hand, when a worker or a work vehicle needs to cross the conveying device 1, the upstream side conveyor 2 is stopped, the conveyance of the article W is stopped, and the path forming device 6 is further made to take the path opening posture (FIG. 2). In the path opening posture illustrated in FIG. 2, the path forming device 6 forms a path 90 that intersects with the conveying passage, in a part of the conveying passage. That is, the path forming device 6 takes the path opening posture, so that the worker can walk through the path or the work vehicle can pass through the path 90.

The movable side conveyor device 5 protrudes from the fixed side conveyor device 4 side in the cantilever state, and therefore when the movable side conveyor device 5 is housed in the fixed side conveyor device 4 side, nothing exists on the path 90, and the worker or the like can pass.

As described above, in the path forming device 6, the engaging members 27a, 27b can be reciprocated by the single driving roller 12 (motor-incorporating roller). Therefore, horizontal movement and lifting and lowering movement of the movable side conveyor device 5 can be performed by the single driving roller 12.

As the annular member, in addition to the exemplified chains 50a, 50b, a string-like material such as a belt and a rope can be employed.

In the above example, the fixed side conveyor device and the movable side conveyor device have almost the same length, but the length of the movable side conveyor device may be shorter than the length of the fixed side conveyor device. Also in this case, the movable side conveyor device can be housed in the space below the fixed side conveyor device.

In the above example, the receiving members 26a, 26b are used. However, in some cases, the receiving members 26a, 26b can be omitted. That is, in a case where the length of the movable side conveyor device 5 from the upstream side to the downstream side is about a half of the length of the fixed side conveyor device, the receiving members 26a, 26b are omitted, the horizontal sections 38a, 38b provided in the receiving members 26a, 26b are provided in the side plates 22a, 22b of the intermediate interposed member 25, and the engaging members 27a, 27b are placed.

Figure 14A:
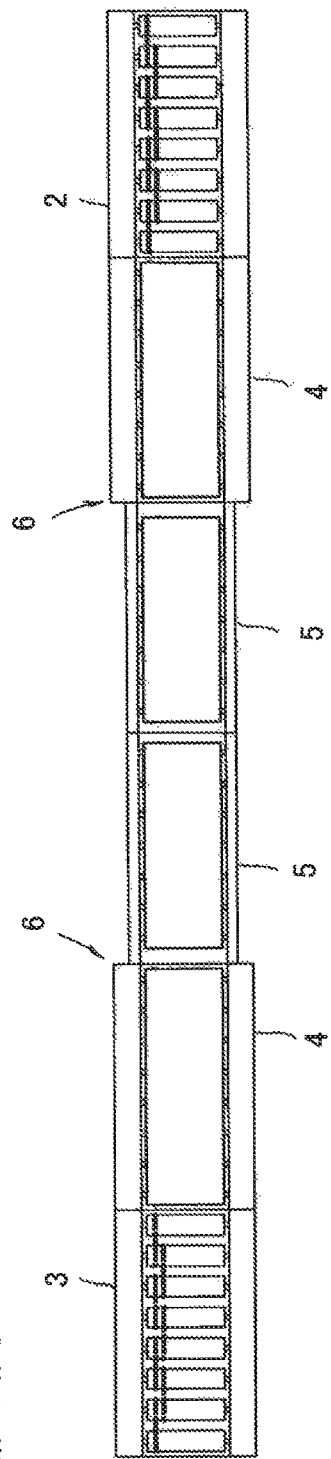
FIGS. 14a and 14b are is a plan view illustrating a layout where two path forming devices of the present invention are installed on a conveying passage.
Figure 14B:
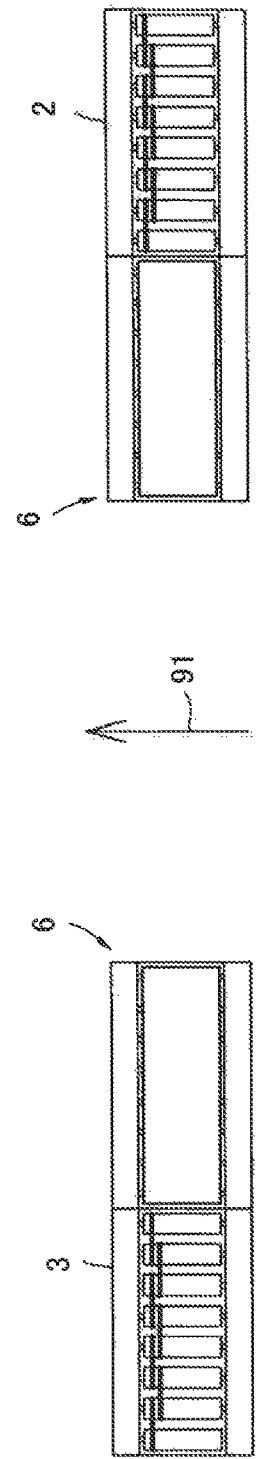

As illustrated in FIG. 14A and FIG. 14B, two path forming devices 6 can be disposed so as to face each other.

In this case, in the path opening posture, a path 91 can be widely provided, and a larger work vehicle or the like can be made to pass.

In the above example, the fixed side conveyor device 4 and the movable side conveyor device 5 are belt conveyors, but may be roller conveyors.

EXPLANATION OF REFERENCE SIGNS

1: conveying device (article conveying passage)
4: fixed side conveyor device
5: movable side conveyor device
6: path forming device
7: driving device (driving unit)
12: driving roller
18, 19: linear guide
20: blocking member (movement preventing unit)
21: blocking member (movement preventing unit)
25: intermediate interposed member
27a, 27b: engaging member
40a, 40b: blocking member (movement preventing unit)
41a, 41b: blocking member (movement preventing unit)
50a, 50b: chain (annular member)
52a, 52b: downstream side cam section (cam)
55a, 55b: upstream side cam section (cam)
90: path
91: path

The invention claimed is:

1. A path forming device for forming a part of a series of article conveying passage that includes a plurality of conveyors and opening a path through which a worker can walk to cross the article conveying passage, the path forming device comprising:
a fixed side conveyor device located at a constant height position;
a movable side conveyor device;
a lifting and lowering function that lifts and lowers the movable side conveyor device; and
a linear movement function that linearly moves the movable side conveyor device, wherein
the movable side conveyor device is capable of assuming:
an article conveying posture in which the movable side conveyor device protrudes from the fixed side conveyor device in a cantilever state, and is linearly aligned with the fixed side conveyor device at substantially the same height as the fixed side conveyor device; and
a path opening posture in which a height of the movable side conveyor device is lowered by the lifting and lowering function, the movable side conveyor device is made to move to the fixed side conveyor device by the linear movement function, the movable side conveyor device is located under the fixed side conveyor device, and a part of or all of the movable side conveyor device overlaps with the fixed side conveyor device on the same plane,
wherein with the movable side conveyor device assuming the path opening posture, an opening is formed between an end of adjacent one the plurality of conveyors and an end of the path forming device to define the path intersecting the conveying passage.

2. The path forming device according to claim 1, further comprising:
a linear guide that guides the movable side conveyor device so as to linearly move;
an engaging member that linearly moves; and
a cam,
wherein the engaging member is engaged with the movable side conveyor device to push and pull the movable side conveyor device, and
wherein the movable side conveyor device is engaged with the cam to be made to lift and lower.

3. The path forming device according to claim 2,
wherein the cam is formed in the engaging member,
wherein the path forming device comprises a movement preventing unit that prevents the movable side conveyor device from moving in a direction away from the fixed side conveyor device beyond a terminal position, the terminal position being defined as a position where the movable side conveyor device protrudes from the fixed side conveyor device in the cantilever state to reach a state in which the movable side conveyor device and the fixed side conveyor device do not overlap with each other on the same plane, and
wherein when the movable side conveyor device is at the terminal position and the engaging member further moves, the movable side conveyor device is raised by the cam provided in the engaging member to reach substantially the same height as the fixed side conveyor device.

4. The path forming device according to claim 2,
wherein an intermediate interposed member is provided between the fixed side conveyor device and the movable side conveyor device, the intermediate interposed member being linearly movable with respect to the fixed side conveyor device, the movable side conveyor device being further linearly movable with respect to the intermediate interposed member, and
wherein a linear movement direction of the intermediate interposed member with respect to the fixed side conveyor device, and a linear movement direction of the movable side conveyor device with respect to the intermediate interposed member coincide with each other.

5. The path forming device according to claim 2, further comprising:
an annular member having the engaging member in a middle thereof; and
a driving unit having a drive motor that makes the annular member run.

6. The path forming device according to claim 5, wherein the engaging member is reciprocated by the single drive motor.

7. The path forming device according to claim 2,
wherein an intermediate interposed member is provided between the fixed side conveyor device and the movable side conveyor device, the intermediate interposed member being linearly movable with respect to the fixed side conveyor device, the movable side conveyor device being further linearly movable with respect to the intermediate interposed member, and
wherein a linear movement direction of the intermediate interposed member with respect to the fixed side conveyor device, and a linear movement direction of the movable side conveyor device with respect to the intermediate interposed member coincide with each other.

8. The path forming device according to claim 3, further comprising:
an annular member having the engaging member in a middle thereof; and
a driving unit having a drive motor that makes the annular member run.

9. The path forming device according to claim 8, wherein the engaging member is reciprocated by the single drive motor.

10. The path forming device according to claim 3,
wherein an intermediate interposed member is provided between the fixed side conveyor device and the movable side conveyor device, the intermediate interposed member being linearly movable with respect to the fixed side conveyor device, the movable side conveyor device being further linearly movable with respect to the intermediate interposed member, and
wherein a linear movement direction of the intermediate interposed member with respect to the fixed side conveyor device, and a linear movement direction of the movable side conveyor device with respect to the intermediate interposed member coincide with each other.

11. The path forming device according to claim 4, further comprising:
an annular member having the engaging member in a middle thereof; and
a driving unit having a drive motor that makes the annular member run.

12. The path forming device according to claim 11, wherein the engaging member is reciprocated by the single drive motor.

13. The path forming device according to claim 7, further comprising:
an annular member having the engaging member in a middle thereof; and
a driving unit having a drive motor that makes the annular member run.

14. The path forming device according to claim 13, wherein the engaging member is reciprocated by the single drive motor.

15. The path forming device according to claim 10, further comprising:
an annular member having the engaging member in a middle thereof; and
a driving unit having a drive motor that makes the annular member run.

16. The path forming device according to claim 15; wherein the engaging member is reciprocated by the single drive motor.

17. The path forming device according to claim 1, wherein the fixed side conveyor device comprises a housing with a space there inside, the space being capable of housing the movable side conveyor device.

* * * * *